(12) United States Patent
Malvar et al.

(10) Patent No.: US 7,502,505 B2
(45) Date of Patent: Mar. 10, 2009

(54) HIGH-QUALITY GRADIENT-CORRECTED LINEAR INTERPOLATION FOR DEMOSAICING OF COLOR IMAGES

(75) Inventors: Henrique S. Malvar, Sammamish, WA (US); Li-wei He, Redmond, WA (US); Ross Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1046 days.

(21) Appl. No.: 10/801,450

(22) Filed: Mar. 15, 2004

(65) Prior Publication Data

US 2005/0201616 A1 Sep. 15, 2005

(51) Int. Cl.
*G06K 9/00* (2006.01)
*G06K 9/32* (2006.01)
(52) U.S. Cl. .................. 382/162; 382/167; 382/300
(58) Field of Classification Search ............... 382/162, 382/167, 254, 299, 300; 348/246, 441; 358/525
See application file for complete search history.

(56) References Cited

U.S. PATENT DOCUMENTS

| | | | |
|---|---|---|---|
| 3,971,065 A | 7/1976 | Bayer | |
| 4,724,395 A | 2/1988 | Freeman | |
| 5,373,322 A | 12/1994 | Laroche et al. | |
| 5,506,619 A | 4/1996 | Adams, Jr. et al. | |
| 5,805,217 A * | 9/1998 | Lu et al. | 348/273 |
| 6,654,492 B1 * | 11/2003 | Sasai | 382/162 |
| 6,771,828 B1 | 8/2004 | Malvar | |
| 6,847,396 B1 * | 1/2005 | Lin | 348/273 |
| 7,236,191 B2 * | 6/2007 | Kalevo et al. | 348/222.1 |
| 2002/0015447 A1 | 2/2002 | Minhua Zhou | |
| 2002/0167602 A1 | 11/2002 | Truong-Thao Nguyen | |

OTHER PUBLICATIONS

Chang, E., Cheung, S. and Pan, D. Y., "Color filter array recovery using a threshold-based variable number of gradients," *Proc. SPIE*, vol. 3650, pp. 36-43, Jan. 1999.
Gunturk, B. K., Altunbasak, Y. and Mersereau, R. M., "Color plane interpolation using alternating projections", *IEEE Trans. on Image Processing*, vol. 11, pp. 997-1013, Sep. 2002.
Kimmel, R., "Demosaicing: image reconstruction from color CCD samples," *IEEE Trans. on Image Processing*, vol. 8, pp. 1221-1228, Sep. 1999.

(Continued)

*Primary Examiner*—Brian Q Le
(74) *Attorney, Agent, or Firm*—Lyon & Harr, L.L.P.; Craig S. Fischer

(57) ABSTRACT

A gradient-corrected linear interpolation method and system for the demosaicing of color images. The method and system compute an interpolation using some a current technique (preferably a bilinear interpolation technique to reduce computational complexity), compute a correction term (such as a gradient of a desired color at a given pixel), and linearly combine the interpolation and the correction term to produce a corrected, high-quality interpolation of a missing color value at a pixel. The correction term may be a gradient correction term computed from the current color of the current pixel. This gradient is directly used to affect and correct the estimated color value produced by the prior art interpolation technique. The gradient-corrected linear interpolation method and system may also apply a gradient-correction gain to the gradient correction term. This gradient-correction gain affects the amount of gradient correction that is applied to the interpolation.

32 Claims, 17 Drawing Sheets

GRADIENT CORRECTION COMPUTATION PROCESS

OTHER PUBLICATIONS

Longére, P., Zhang, X., Delahunt, P. B. and Brainard, D. H., "Perceptual assessment of demosaicing algorithm performance," *Proc. IEEE*, vol. 90, pp. 123-132, Jan. 2002.

Pei, S-C. and Tam, L-K., "Effective color interpolation in CCD color filter array using signal correlation," *Proc. ICIP*, pp. 488-491, Sep. 2000.

Ramanath, R., Synder, W. E. and Bilbro, G. L., "Demosaicking methods for Bayer color arrays," *J. Electronic Imaging*, vol. 11, pp. 306-315, Jul. 2002.

Koh, C. C., J. Mukherjee, S. K. Mitra, New efficient methods of image compression in digital cameras with color filter array, IEEE Transactions on Consumer Electronics, Nov. 2003, pp. 1448-1456, vol. 49, No. 4.

Lux, P., A novel set of closed orthogonal functions for picture coding, Arch. Elek. Ubertragung, 1977, vol. 31, pp. 267-274.

Malvar, H. S., L.-W. He, and R. Cutler, High-quality linear interpolation for demosaicing of Bayer-patterned color images, IEEE Int'L Conf. on Acoustics, Speech, and Signal Processing, Montreal, Canada, May 2004.

Malvar, H., Sullivan, G., YCoCg-R: A Color Space with RGB Reversibility and Low Dynamic Range, Joint Video Team (JVT) of ISO/IEC MPEG & ITU-T VCEG (ISO/IEC JTC1/SC29/WG11 and ITU-T SG16 Q.6), JVT PExT Ad Hoc Group Meeting: Jul. 22-24, 2003, Trondheim Document: JVT-1014.

Toi, T., M. Ohita, A subband coding technique for image compression in single CCDcameras with Bayer color filter arrays, IEEE Transactions on Consumer Electronics, pp. 176-180, vol. 45, No. 1, Silicon Syst. Res. Lab., NEC Corp., Kanagawa.

Wu, X., N. Zhang, Primary-consistent soft-decision color demosaicking for digital cameras, IEEE Transactions on Image Processing, vol. 13, No. 9, Sep. 2004, pp. 1263-1274.

* cited by examiner

PRIOR ART

|   | 1 | 2 | 3 | 4 | 5 |
|---|---|---|---|---|---|
| 1 |   |   | $G_{13}$ |   |   |
| 2 |   | $G_{22}$ |   | $G_{24}$ |   |
| 3 | $G_{31}$ | $R_{32}$ | $G_{33}$ | $R_{34}$ | $G_{35}$ |
| 4 |   | $G_{42}$ |   | $G_{44}$ |   |
| 5 |   |   | $G_{53}$ |   |   |

| | 1 | 2 | 3 | 4 | 5 |
|---|---|---|---|---|---|
| 1 | | | $G_{13}$ | | |
| 2 | | $G_{22}$ | | $G_{24}$ | |
| 3 | $G_{31}$ | $B_{32}$ | $G_{33}$ | $B_{34}$ | $G_{35}$ |
| 4 | | $G_{42}$ | | $G_{44}$ | |
| 5 | | | $G_{53}$ | | |

HIGH-QUALITY GRADIENT-CORRECTED LINEAR INTERPOLATION FOR DEMOSAICING OF COLOR IMAGES

TECHNICAL FIELD

The present invention relates in general to processing of digital color images and more particularly to method and system of linearly combining a correction term with an interpolation to obtain a high-quality estimate of a missing pixel color at a pixel within the image.

BACKGROUND OF THE INVENTION

Digital cameras continue to steadily increase in popularity with consumers. One reason is that the cost of digital cameras continues to decline, making them well within the reach of the average consumer, and causing more consumers to forego traditional film photography in favor of digital cameras. In order to contain cost, many consumer-grade digital color cameras are single-sensor digital cameras. As the name implies, in a single-sensor digital camera only a single image sensor is used to capture color information for each pixel in a color image. Each image sensor, which is typically a charge-coupled device (CCD) or a complementary metal oxide semi-conductor (CMOS), is part of a sensor array that together represent the pixels of a color image.

Each image sensor can only generate information about a single color at a given pixel. A color image, however, is represented by combining three separate monochromatic images. In order to display a color image, all of the red, blue and green (RGB) color values are needed at each pixel. In an ideal (and expensive) camera system, each pixel in the sensor array would be provided with three image sensors, each one measuring a red, green or blue pixel color. In a single-sensor digital camera, however, only a single red, blue or green color value can be determined at a given pixel. In order to obtain the other two missing colors, a technique must be used to estimate or interpolate the missing colors from surrounding pixels in the image. This class of estimation and interpolation techniques is called "demosaicing".

The "demosaicing" term is derived from the fact that a color filter array (CFA) is used in front of the image sensors, with the CFA being arranged in a mosaic pattern. This mosaic pattern has only one color value for each of the pixels in the image. In order to obtain the full-color image, the mosaic pattern must be "demosaiced". Thus, demosaicing is the technique of interpolating back the image captured with a mosaic-pattern CFA, so that a full RGB value can be associated with every pixel.

More specifically, a single-sensor digital camera captures the image using an image sensor array that is preceded in the optical path by a CFA. A highly common mosaic CFA is called the Bayer mosaic pattern. The Bayer mosaic pattern (or Bayer filter) is shown in FIG. 1. For each 2×2 set of pixels, two diagonally opposed pixels have green filters, and the other two pixels have red and blue filters. Since the color green (G) carries most of the luminance information for humans, its sampling rate is twice that of the color red (R) and the color blue (B). The Bayer filter is described in U.S. Pat. No. 3,971,065 by Bayer entitled "Color Imaging Array".

There are multitudes of demosaicing techniques available. One of the simplest approaches to demosaicing is bilinear interpolation. In general, bilinear interpolation uses three color planes that are independently interpolated using symmetric bilinear interpolation. This interpolation uses a pixel's nearest neighbors having the same color as the color that is being interpolated. In particular, referring again to FIG. 1, in bilinear interpolation the green value g(i,j) at a pixel position (i,j) that falls in a red or blue pixel is computed by the average of the neighboring green values in a cross pattern, as follows, $$\hat{g}(i, j) = \frac{1}{4} \sum g(i+m, j+n) \qquad (1)$$

$$(m, n) = \{(0, -1), (0, 1), (-1, 0), (1, 0)\}$$

Equation (1) corresponds to estimating the green value at the pixel marked '+' (also called the "current pixel") in FIG. 1 as the average of the observed green values marked '−'. It should be noted that the current pixel has a red color, and therefore the green and blue color values need to be interpolated. At image boundaries, only pixels that fall within the image are included, and the scaling adjusted.

A graphic illustration of how missing colors are interpolated at a given pixel using bilinear interpolation is shown in FIGS. 2A-H. As shown in FIGS. 2A-H, it should be noted that bilinear techniques typically uses small region of support. The region of support is the size of a pixel neighborhood whose values are considered for the interpolation of any given pixel. As shown in FIGS. 2A-H, the region of support for the bilinear interpolation techniques described below typically is a 3×3 pixel region of support. Using this small of a region of support keeps memory usage and computational complexity to a minimum.

Referring to FIGS. 2A and 2B, illustrated is the bilinear interpolation technique of equation (1) for finding a green color value at a given pixel. In FIG. 2A, a green color value at a red pixel is found by using the green pixels neighboring the red pixel. These neighboring green pixels are marked with a "1" in FIG. 2A. Similarly, in FIG. 2B, a green color value at a blue pixel is found by using the green pixels neighboring the blue pixel. Once again, the green pixels are marked with a "1".

To find missing red (R) or blue (B) colors, equation (1) still applies. However, now a diagonal cross pattern is used. An exception is that for pixel positions (i,j) that fall in a green pixel only two red neighboring pixels are averaged to produce an interpolated red color value, because there are only two immediately neighboring red pixels. The same is also true for finding blue color values. It should be noted that, besides the computational simplicity of equation (1), its output value is guaranteed to have the same dynamic range of the input value, so no overflow detection and control logic is needed on the output value.

More specifically, FIGS. 2C-E illustrate the bilinear interpolation technique of equation (1) for finding a red color value at a given pixel. Specifically, in FIG. 2C, a red color value is found at a green pixel in a red row and a blue column by using the two red neighboring pixels. Similarly, In FIG. 2D, a red color value at a green pixel in a blue row and a red column is found by using the two neighboring red pixels in the red column. In FIG. 2E, a red color value at a blue pixel is found using the four neighboring red pixels. In FIGS. 2C-E, each of the neighboring red pixels used in the bilinear interpolation technique are marked with a "1".

Similarly, FIGS. 2F-H illustrate the bilinear interpolation technique of equation (1) for finding a blue color value at a given pixel. Specifically, in FIG. 2F, a blue color value is found at a green pixel in a blue row and a red column by using the two blue neighboring pixels. In FIG. 2G, a blue color value at a green pixel in a red row and a blue column is found by using the two neighboring red pixels in the blue column. In FIG. 2H, a blue color value at a red pixel is found using the four neighboring blue pixels. In FIGS. 2F-H, each of the neighboring blue pixels used in the bilinear interpolation technique are marked with a "1".

One problem, however, with the above-described bilinear interpolation techniques is that they generate significant artifacts in the color image. This is especially true across edges and other high-frequency content in the image, since bilinear interpolation does not consider the statistical correlation among RGB values. For example, referring to FIGS. 2D and 2F, suppose there is a sharp change in pixel intensity values, so that all pixels in the rightmost column are much brighter than the others. Then, the interpolated blue value of the center pixel (from FIG. 2F) will be somewhat bright, because its blue neighbor to the right is very bright. However, the interpolated red value for that same pixel (from FIG. 2D) will not be bright, because its two red neighbors are not very bright. Therefore, in this case there will be a bright interpolated blue pixel and a not so bright interpolated red pixel; the excess blue and lack of red will make the interpolated pixel color be tinted towards cyan, causing a color fringe artifact. Thus, while bilinear interpolation techniques are fast, computationally non-intensive, and easy to implement, they are also notorious for producing low-quality images due to the significant artifacts (mainly blurriness and color fringing) that they generate.

Better, albeit more complex, interpolation techniques take correlation among RGB values into account. One group of interpolation techniques consider such correlation by using improved linear filters. For example, such a technique is described in a paper by S.-C. Pei and I.-K. Tam entitled "Effective color interpolation in CCD color filter array using signal correlation," in *Proc. ICIP*, pp. 488-491, September 2000. Another group of interpolation techniques consider such correlation by using nonlinear filters. These nonlinear filters essentially adapt interpolation smoothness to a measure of image activity or edginess. For example, these nonlinear interpolation techniques are discussed in the following papers: (1) P. Longère, X. Zhang, P. B. Delahunt, and D. H. Brainard, "Perceptual assessment of demosaicing algorithm performance," *Proc. IEEE*, vol. 90, pp. 123-132, January 2002; and (2) R. Ramanath, W. E. Snyder, and G. L. Bilbro, "Demosaicking methods for Bayer color arrays," *J. Electronic Imaging*, vol. 11, pp. 306-315, July 2002.

Exploiting correlation among RGB channels is the main idea behind improving demosaicing performance in nonlinear interpolation techniques. Specifically, it can be assumed that in a luminance/chrominance decomposition, the chrominance components do not vary much across pixels. In a constant-hue approach described in U.S. Pat. No. 4,724,395 to Freeman entitled, "Median filter for reconstructing missing color samples", the green channel is bilinearly interpolated and then the red and blue channels are interpolated so as to maintain a constant hue, defined as the R/G and B/G ratios. However, one problem with this technique by Freeman is that even at the expense of computing these ratios, the technique still produces visible artifacts. Moreover, using complex operations (such as division and multiplication) in the computing of interpolations greatly increases the computational complexity, processing overhead, and implementation cost.

Improved results for nonlinear interpolation techniques can be obtained by starting with bilinearly interpolated green pixels and then applying median filters to the interpolated values of the color differences R-G and B-G. Improved performance can be obtained by using gradient-based nonlinear techniques, which typically estimate edge directions and adjust the interpolation formulas so that filtering is performed preferentially along edge directions, and not across them. For example, one gradient-based nonlinear technique is described in U.S. Pat. No. 5,373,322 to C. A. Laroche and M. A. Prescott entitled "Apparatus and method for adaptively interpolating a full color image utilizing chrominance gradients". The Laroche and Prescott technique interpolates the green channel by using both the red and blue channels to determine edge directions, which determine unequal weights to the terms in equation (1) for the green channel. The color differences R-G and B-G then are interpolated. A technique described in U.S. Pat. No. 5,506,619 to J. E. Adams and J. F. Hamilton, Jr., entitled "Adaptive color plane interpolation in a single color electronic cameras" improves on the Laroche and Prescott technique by considering both first and second order pixel differences (see also J. E. Adams, "Design of practical color filter array interpolation algorithms for digital cameras," *Proc. SPIE*, vol. 3028, pp. 117-125, Feb. 1997). These gradient techniques, however, merely compute a gradient and use it to select which interpolation technique to use.

A technique described in a paper by E. Chang, S. Cheung, and D. Y. Pan, entitled "Color filter array recovery using a threshold-based variable number of gradients," in *Proc. SPIE*, vol. 3650, pp. 36-43, Jan. 1999, is an improvement on the above techniques by considering a variable number of gradients. A simpler but efficient algorithm that uses soft decision rules to combine interpolation results from horizontal and vertical directions is presented in a paper by X. Wu and N. Zhang, entitled "Primary-consistent soft-decision color demosaic for digital cameras," in *Proc. ICIP*, vol. 1, pp. 477-480, September 2003.

Iterative methods can lead to further improvement by using results from blue and red interpolations to correct the green interpolation, and vice-versa. That is the basis of a technique described in a paper by R. Kimmel, "Demosaicing: image reconstruction from color CCD samples," *IEEE Trans. on Image Processing*, vol. 8, pp. 1221-1228, September 1999. In Kimmel's approach, the interpolation steps are based on a combination of the constant-hue and gradient-based methods. A technique based on iterative projections is presented in a paper by B. K. Gunturk, Y. Altunbasak, and R. M. Mersereau, entitled "Color plane interpolation using alternating projections", in *IEEE Trans. on Image Processing*, vol. 11, pp. 997-1013, September 2002. The Gunturk technique has the best performance to date on a popular set of standard test images. One problem, however with the Gunturk technique is that it has a very high complexity (as many as 480 operations per input pixel).

The above-described nonlinear interpolation techniques typically use a larger region of support that is used in bilinear interpolation techniques. For example, a 5×5 pixel region of support is typical for these nonlinear techniques. A 5×5 region of support yields good correlation between RGB values and produce high-quality images. A smaller region of support greatly reduces the image quality, while larger regions of support require more memory and greatly increase computational complexity.

Therefore, what is needed is an interpolation technique for demosaicing color images that retains the simplicity and speed of the bilinear interpolation technique while producing the high-quality images of more complex techniques, such as nonlinear interpolation techniques. What is also needed is a high-quality interpolation technique that considers correlation among RGB values to improve performance. What is further needed is an interpolation technique that considers this correlation by computing a gradient and uses this computed gradient directly as a correction term and not merely to select an interpolation technique. What is also needed is an interpolation technique that utilizes a larger region of support than bilinear techniques (where the region of support is comparable to that used in nonlinear techniques) for improved quality. What is further needed is an interpolation technique that requires only simple mathematical operations (such as addition) when computing interpolations to increase speed, avoid computational complexity, and allow inexpensive implementation.

SUMMARY OF THE INVENTION

The invention disclosed herein includes a high-quality linear interpolation method and system for demosaicing of digital color images. The present invention overcomes the above-mentioned deficiencies of current interpolation techniques by providing a high-quality interpolation that is simple to implement and cost efficient. Namely, the gradient-corrected linear interpolation method and system disclosed herein uses color information from a current pixel to obtain a correction term. This correction term then is linearly combined with a prior art interpolation to provide an improved estimate of a missing color at the current pixel. The gradient-corrected linear interpolation method and system have a better performance and lower complexity than current prior art linear demosaicing techniques. In addition, the gradient-corrected linear interpolation method and system outperform many prior art nonlinear demosaicing techniques having a much greater complexity.

The gradient-corrected linear interpolation method and system can operate on color images captured by digital cameras. Prior to display, the image is demosaiced using the gradient-corrected linear interpolation method and system. Alternatively, a captured digital color image can be stored in a computing device in a compressed mosaiced form. If an application on the computing device needs to access the image, the application typically calls an appropriate application programming interface (API) to obtain the decompressed data. Most applications expect data in the RGB format, so the demosaicing must be performed before the image data is sent to the requesting application.

The gradient-corrected linear interpolation method includes computing an interpolation of a desired color at a current pixel having a current color, where the desired color is used in the interpolation. Next, a correction term is computed using the current color. The correction term then is linearly combined with the interpolation to obtain a corrected interpolation of the desired color at the current pixel. Preferably, in order to simplify computation and preserve computing resources, the interpolation is a prior art bilinear interpolation (such as the one described in the background). However, the interpolation may be virtually any one of the available prior art demosaicing techniques, including linear and nonlinear interpolations.

The correction term is preferably a gradient correction term computed from the current color of the current pixel. For example, assume the current pixel has a image sensor that is capable of determining a green color value for the pixel, and a red color value at the green pixel is desired, as in FIGS. 2C and 2D. The gradient-corrected linear interpolation method computes a gradient at the green pixel by using the green value at that pixel and the values of neighboring green pixels. A fixed portion (preferably controlled by a gain factor) of that gradient value then is added to the interpolated red value (preferably, a bilinearly interpolated red value). Although some prior art demosaicing techniques do compute gradients, they use the gradient to control how the interpolation is computed. On the other hand, the gradient-corrected linear interpolation method disclosed herein uses the gradient directly as a correction term. In other words, some prior art demosaicing techniques compute a gradient and use the gradient to choose an interpolation method based on the gradient, while the gradient-corrected linear interpolation method uses the gradient directly to affect and correct the value produced by a prior art demosaicing technique.

The gradient correction term is linearly combined with the interpolation. Preferably, the gradient correction term is added to the interpolation to improve the estimate of the desired color. The prior art demosaicing techniques that do use gradients typically compute and use complex operators based on the gradients, such as nonlinear filters, "if" statements, and division operations. The gradient-corrected linear interpolation method simplifies computation by using a linear operation to linearly combining the gradient correction term with the interpolation, where the linear operation preferably is addition.

The gradient-corrected linear interpolation method also includes applying a gradient-correction gain to the gradient correction term. This gradient-correction gain affects the amount of gradient correction that is applied to the interpolation. For example, if the gradient-correction gain is 0.8, then only 80% of the gradient correction is linearly combined with the interpolation. The gradient-correction gain can be selected in a variety of ways. The optimal gradient-correction gain is computed by minimization a mean-squared error. An approximation to this optimal value allows computations using integer arithmetic, no division operations, or both. The gradient-correction may also be selected based on characteristics of the color image sensor or characteristics of an entire digital camera system. The gradient-correction gain may also be varied within the image, if so desired, based on statistics of the color image. These statistics may include the global statistics of the image, the local statistics of the image, or both.

The gradient-corrected linear interpolation method includes defining a region of support as the size of a pixel neighborhood that immediately surrounds the current pixel. The region of support then is selected to include pixels nearest the current pixel having the current color and using the region of support to compute the interpolation and the correction term. Preferably, the region of support includes a 5×5 pixel region that is centered at the current pixel. Alternatively, the region of support may be greater than a 5×5 pixel region. There also may be more than one region of support. For example, a first region of support may be used to compute the interpolation, while a second region of support may be used to compute the correction term.

A gradient-corrected linear interpolation system uses the method described above to produce a high-quality interpolation of missing color at a given pixel in a quick, simple and efficient manner. The gradient-corrected linear interpolation system includes a current pixel selector, that selects a current pixel having a current color, and an interpolation module, which computes a first interpolation of color value that is missing and desired at the current pixel. The gradient-corrected linear interpolation system also includes a correction term module, that computes a correction term for the interpolation, and a linear combination module that linearly combines the interpolation and correction term to obtain the desired (or missing) color value at the current pixel.

The correction term computation module further includes a gradient-correction selector that selects the amount of correction that will be applied. Moreover, the correction term computation module also includes a region of support module, which defines a region of support around the current pixel, and a gradient correction module that computes a gradient correction using the current pixel. In addition, correction term computation module includes a gradient-correction gain application module that applies the gain to the computed gradient correction such that an adjusted gradient correction is output.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
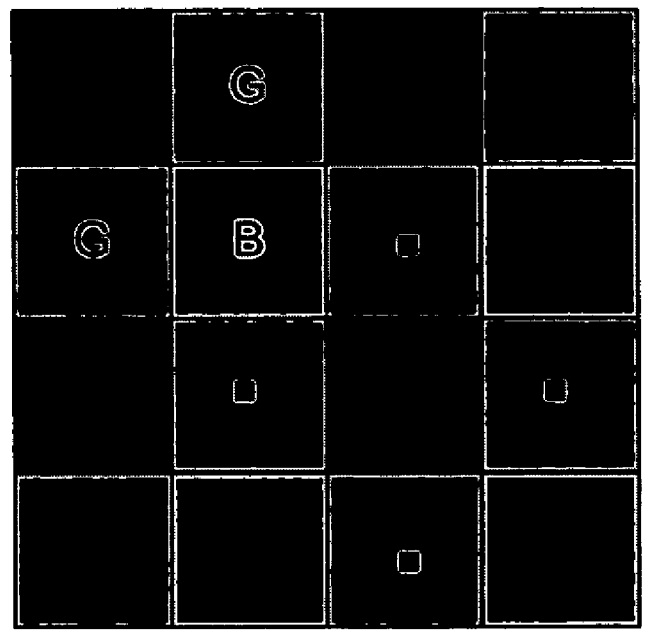
FIG. 1 illustrates a typical Bayer mosaic pattern for color image capture in single image sensor digital camera systems.
Figure 2A:
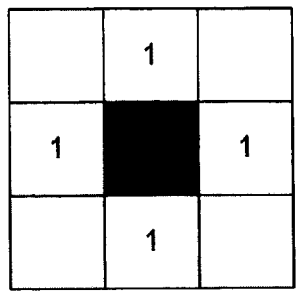
FIG. 2A illustrates a bilinear interpolation technique for finding a green color value at a red pixel.
Figure 2B:
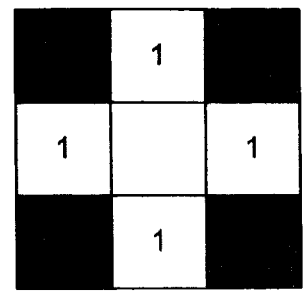
FIG. 2B illustrates a bilinear interpolation technique for finding a green color value at a blue pixel.
Figure 2C:
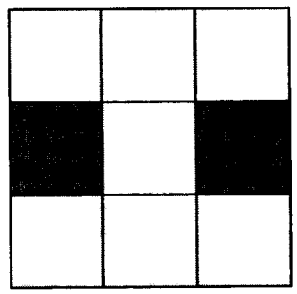
FIG. 2C illustrates a bilinear interpolation technique for finding a red color value at a green pixel in a red row and a blue column.
Figure 2D:
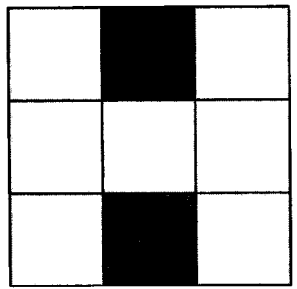
FIG. 2D illustrates a bilinear interpolation technique for finding a red color value at a green pixel in a blue row and a red column.
Figure 2E:
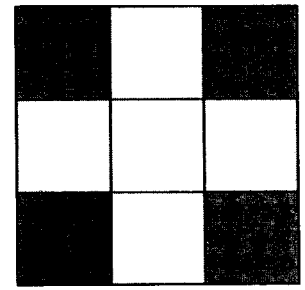
FIG. 2E illustrates a bilinear interpolation technique for finding a red color value at a blue pixel.
Figure 2F:
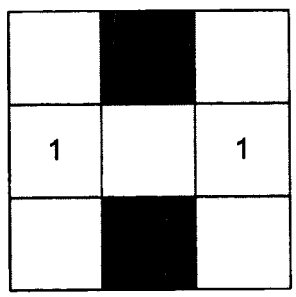
FIG. 2F illustrates a bilinear interpolation technique for finding a blue color value at a green pixel in a blue row and a red column.
Figure 2G:
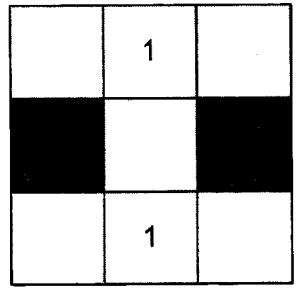
FIG. 2G illustrates a bilinear interpolation technique for finding a blue color value at a green pixel in a red row and a blue column.
Figure 2H:
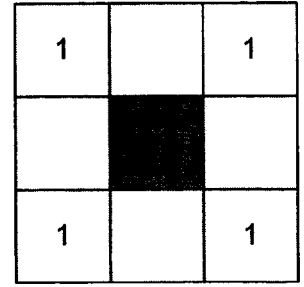
FIG. 2H illustrates a bilinear interpolation technique for finding a blue color value at a red pixel.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Nearly all current digital cameras use a single sensor for each pixel in a color image. As a result, for each pixel, only one of the three red, green and blue (RGB) colors is captured. In order to produce the color image, however, each RGB color value is needed at every pixel. Therefore, the cameras use a technique called "demosaicing" to generate the missing color values at every pixel.

Unfortunately, the techniques for interpolating the missing RGB data are a tradeoff between complexity and quality. For example, bilinear interpolation techniques use simple computational operations, linear operators, and small regions of support (such as a 3×3 region of support). This makes these bilinear interpolation techniques fast, computationally non-intensive, and easy to implement. However, these bilinear techniques also generate significant artifacts in the color image, which can severely degrade image quality. On the other hand, some nonlinear interpolation techniques produce noticeably improved image quality, but are significantly slower, use more processing power, use complex computational operations, and are harder to implement.

The gradient-corrected linear interpolation method and system disclosed herein includes a new interpolation technique for demosaicing of color images. The method and system take an interpolation computed by a current technique, compute a correction term (such as a gradient of the desired color at a given pixel), and linearly combine the interpolation and the correction term. The method and system keep the computational complexity to a minimum by performing fixed linear operations with low-cost operators (such as additions and shifts). Moreover, by directly using a gradient as a correction term and not just a means of choosing an interpolation method, the gradient-corrected linear interpolation method and system simplifies implementation by avoiding the need for complex programming (such as numerous "if" statements, which slow execution). Image quality is improved because the gradient considers correlation among RGB values. The gradient-corrected linear interpolation method and system also utilizes a larger region of support, similar to the nonlinear techniques, to improve estimates of missing color values.

The gradient-corrected linear interpolation method and system can lead to an improvement in peak-signal-to-noise ratio (PSNR) of over 5.5 dB when compared to bilinear interpolation techniques, and about 0.7 dB improvement in red (R) and blue (B) interpolation when compared to some current linear interpolation techniques. The gradient-corrected linear interpolation method and system also outperforms most non-linear interpolation techniques, without the artifacts due to nonlinear processing, and at a greatly reduced computational complexity.

II. General Overview

Figure 3A:
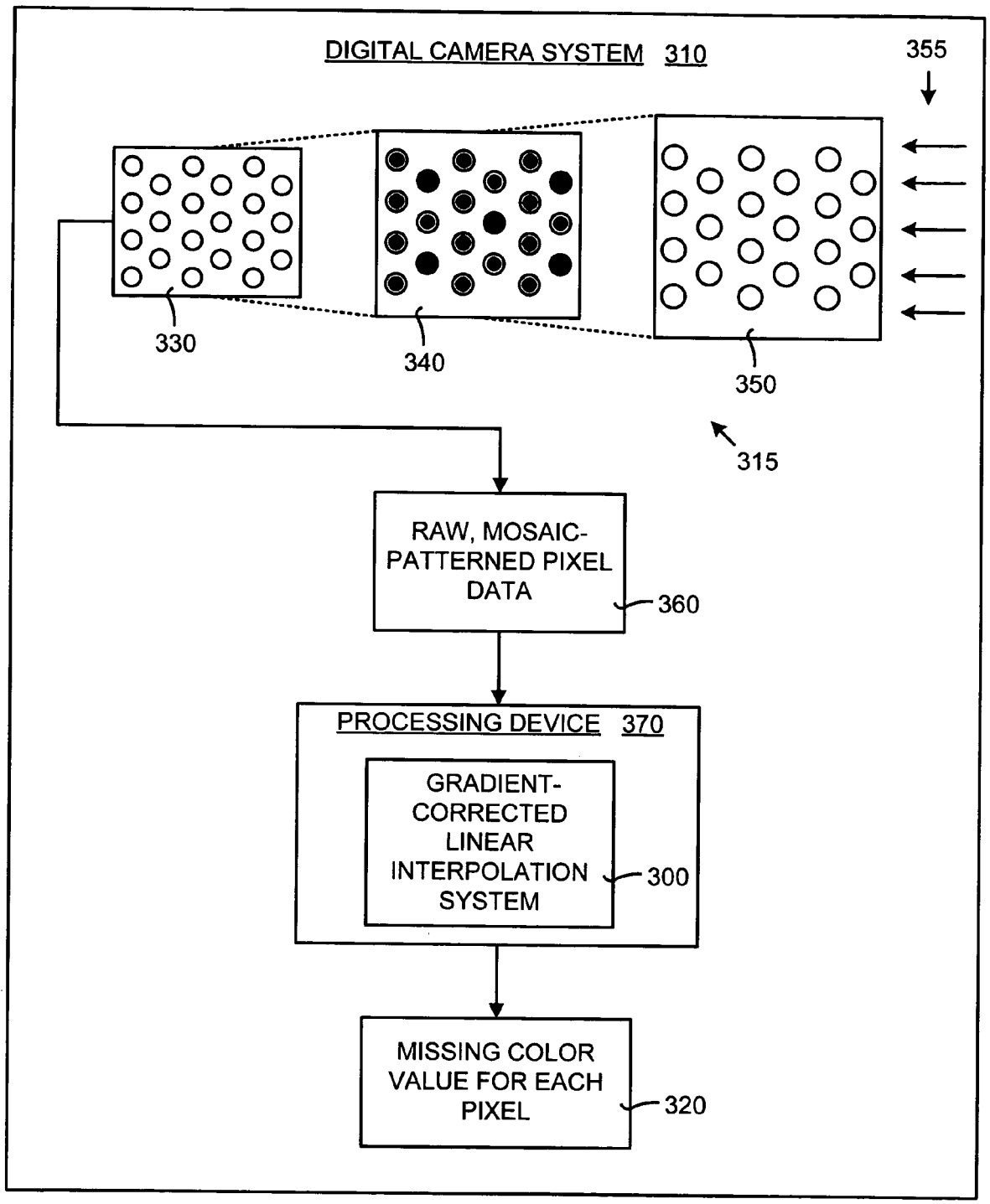
FIG. 3A is a block diagram illustrating a first exemplary implementation of the gradient-corrected linear interpolation system and method disclosed herein.
Figure 3B:
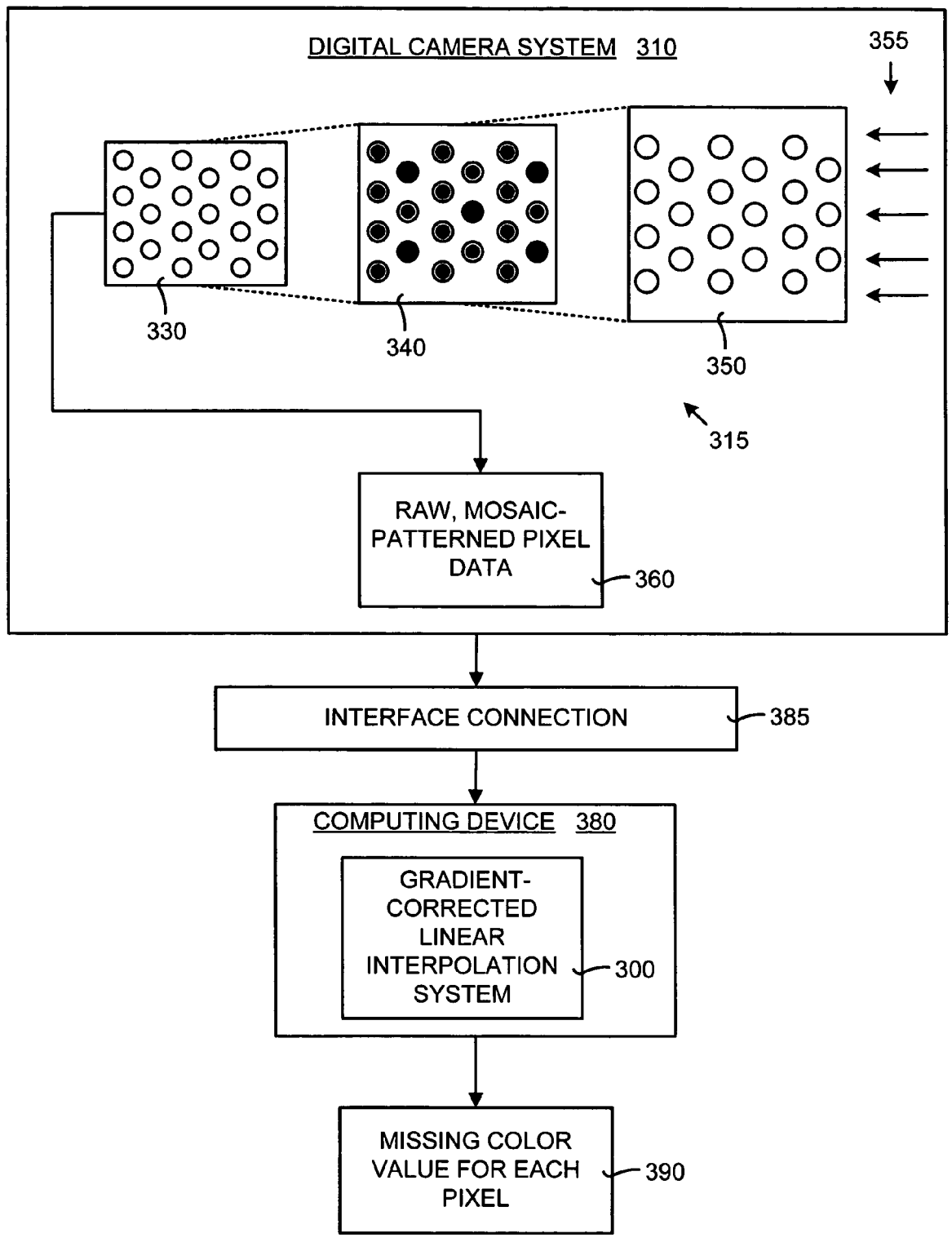
FIG. 3B is a block diagram illustrating a second exemplary implementation of the gradient-corrected linear interpolation system and method disclosed herein.

FIGS. 3A and 3B are block diagrams illustrating two exemplary implementations of the gradient-corrected linear interpolation system and method disclosed herein. It should be noted that FIGS. 3A and 3B are merely two of several ways in which the gradient-corrected linear interpolation system and method may implemented and used.

Referring to FIG. 3A, in the first exemplary implementation, the gradient-corrected linear interpolation system 300 resides on a digital camera system 310. In general, the gradient-corrected linear interpolation system 300 uses the gradient-corrected linear interpolation method to process image data that is obtained from an image sensor array 315 and outputs missing color values for each pixel 320. More specifically, as shown in FIG. 3A, the gradient-corrected linear interpolation system 300 is part of the digital camera system 310 and includes the image sensor array 315. The array 315 is made up of a plurality of image sensors (shown by the circles in FIG. 3A), where each image sensor is capable of determining a single color value.

The image sensor array 315 includes a sensor substrate 330, a color filter array (CFA) 340, and a microlens array 350. It should be noted that typically the microlens array 350 is disposed over the CFA 340, which in turn is disposed over the substrate 330, as indicated in FIGS. 3A and 3B by the dashed lines. The light from an image to be captured (not shown) enters the digital camera system 310 (as shown by the arrows 355). The purpose of the microlens array 350 is to focus the incoming light 355 onto each pixel (represented by a single image sensor). The CFA 340 changes the color response of each pixel. The sensor substrate 330 captures the specific color incoming light (as dictated by the CFA 340) and generates an electrical signal. In this manner, the image sensor array 315 samples the incoming light 355 from an image with red, green and blue sensors arranged in the image sensor array 315.

Each pixel in the image sensor array 315 is the output of a red, green or blue sensor. Thus, the sensor output is an electrical signal from each sensor that corresponds to a single color value for each pixel in the image sensor array 315. The output is raw, mosaic-patterned pixel data 360. As mentioned above, in order to display the full color image, color information for red, green and blue colors must be obtained at each pixel. This is achieved by demosaicing, or the interpolating the missing color values in the mosaic-patterned pixel data 360.

The gradient-corrected linear interpolation system 300 use a novel demosaicing technique to interpolate a high-quality estimate of the missing color values. The gradient-corrected linear interpolation system 300 resides on a processing device 370 located on the digital camera system 310. As detailed below, the gradient-corrected linear interpolation system 300 uses the gradient-corrected linear interpolation method to obtain the missing color values at each pixel 320 in the image sensor array 315.

Referring now to FIG. 3B, in the second exemplary implementation the gradient-corrected linear interpolation system 300 resides on a computing device 380. The raw mosaic-patterned pixel data 360 is sent from the digital camera system 310 to the computing device 380. This pixel data 360 typically is sent to the computing device 380 via an interface connection 385, which can be a USB interface, an IEEE 1394 interface, a Bluetooth® interface, or any other interface suitable for carrying the raw pixel data 360 from the digital camera system 310 to the computing device 380. As detailed below, the gradient-corrected linear interpolation system 300 uses the gradient-corrected linear interpolation method to obtain the missing color values at each pixel 390 for use by the computing device 380.

III. Operational Overview

Figure 4:
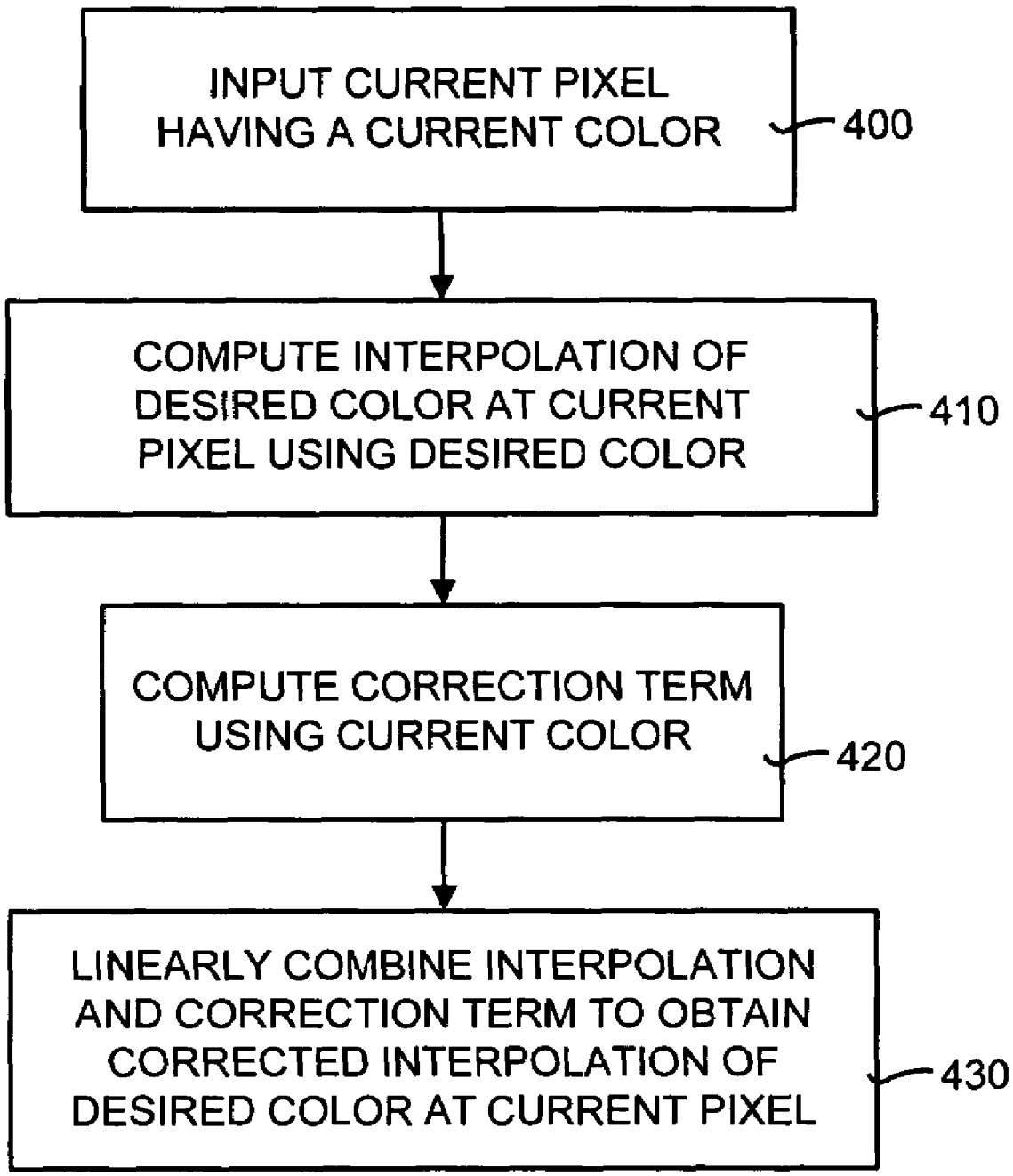
FIG. 4 is a general flow diagram illustrating the general operation of the gradient-corrected linear interpolation system shown in FIG. 3.

The operation of the gradient-corrected linear interpolation system 300 and method used therein shown in FIG. 3 now will be discussed. FIG. 4 is a general flow diagram illustrating the general operation of the gradient-corrected linear interpolation system shown in FIG. 3. The gradient-corrected linear interpolation method begins by inputting a current pixel from a color image (box 400). The current pixel has an associated current color. Namely, the current color is the color that the image sensor of the current pixel is filtered to receive. Next, an interpolation is computed for a desired color at the current pixel (box 410). In other words, any of the missing colors at the current pixel are interpolated or estimated. By way of example, if the current color is green, then the desired color may be red or blue. The interpolation is a prior art interpolation technique, using any of the above-mentioned interpolation techniques including linear, bilinear, nonlinear, bi-cubic and Lanczos interpolation techniques. In a preferred embodiment, a bilinear interpolation technique is used. Moreover, the desired color is used to compute the interpolation. Neighboring pixels of the desired color generally are used in computing the interpolation.

A correction term then is computed (box 420). This computation is performed using the current color of the current pixel. The current pixel typically is used in computing the correction term, along with neighboring pixels of the current pixel having the current color. In a preferred embodiment, the correction term is a gradient correction, obtained by computing a gradient of the current pixel, as discussed in detail below.

The gradient-corrected linear interpolation method and system include the novel criterion that edges have a much stronger luminance than chrominance components. Thus, when computing an interpolation of a green color value at a red pixel, the red color value at that location is not thrown away. Instead, the present invention utilizes this valuable information to compute the correction term. In contrast, prior art interpolation techniques throw this information away. In this example, the red color value would be compared to its interpolated value using a prior art interpolation technique for the neighboring red color values. If it is different from that estimate, it likely means that there is a sharp luminance change at that pixel. The present invention then will correct the interpolated green color value by adding at least a portion of the correction term (corresponding to the estimated luminance change). Such comparisons are implicitly performed by the gradient-based correction terms, so that no "if" statements or conditional branch logic are necessary.

Finally, the interpolation and the correction term are linearly combined to obtain a corrected interpolation of the desired color at the current pixel (box 430). In a preferred embodiment, interpolation and the correction term are added together to obtain the corrected interpolation. Moreover, a gradient-correction gain may be applied to the gradient correction to dictate the amount (or portion or percentage) of the gradient correction that is linearly combined with the interpolation. As explained below, this gradient-correction gain may be selected using a variety of techniques.

Unlike prior art interpolation techniques, when the gradient-corrected linear interpolation method computes the correction term for an interpolation of a green value at a red pixel location, for example, the red value at that location is not discarded. The current color (red value) is valuable information! Instead, the gradient-corrected linear interpolation method compares that red value to its interpolation (or estimate) for the nearest red samples. If the correction term is different from that estimate, it likely indicates there is a sharp luminance change at the current pixel. Thus, the gradient-corrected linear interpolation method corrects a prior art interpolation at the current pixel (having a green color in this example) by linearly combining at least a portion of the correction term to the interpolation, where the correction term represents the this estimated luminance.

IV. Operational Details and Working Example

Figure 5:
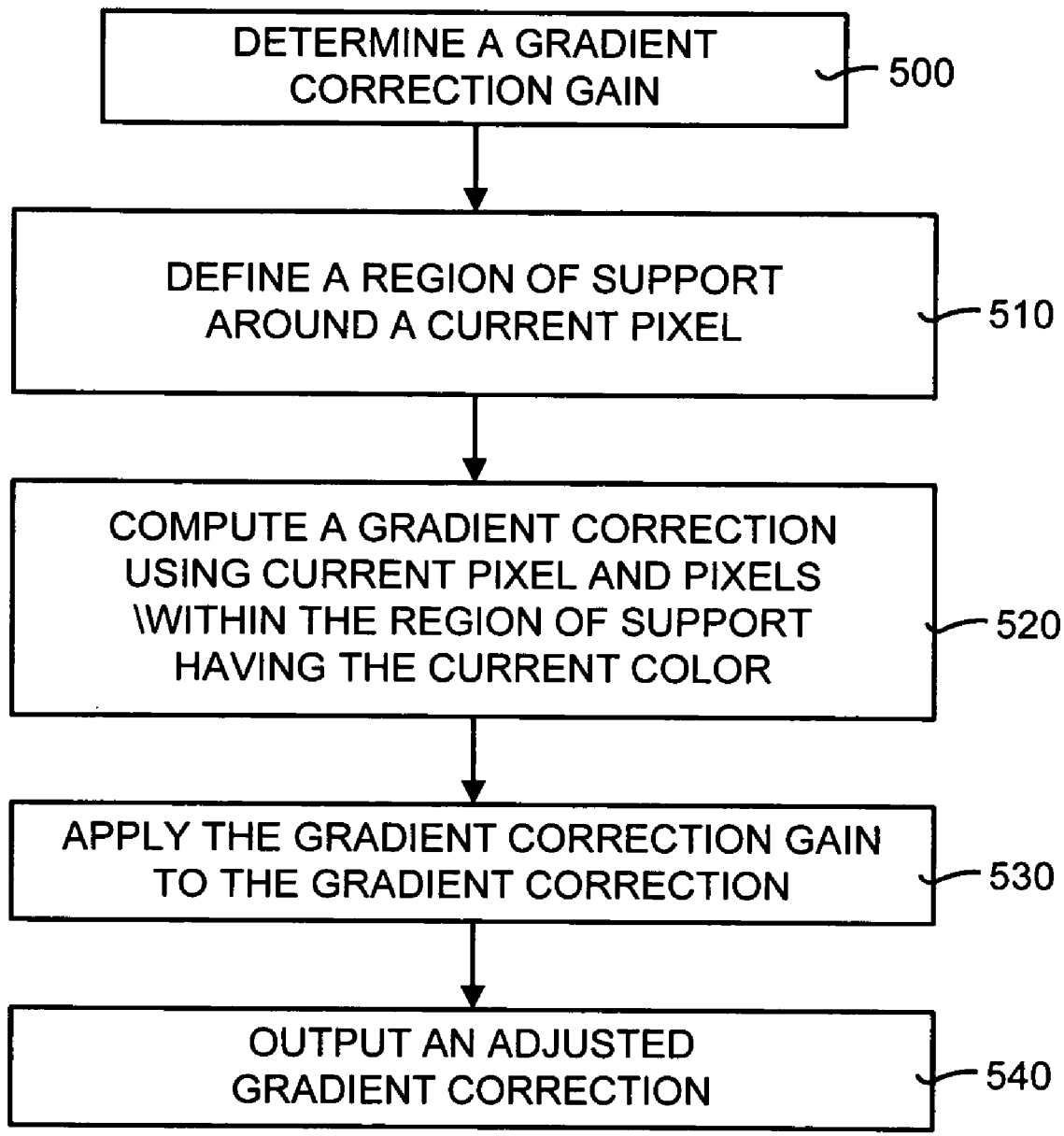
FIG. 5 is a general flow diagram illustrating the gradient correction computation process.

FIG. 5 is a general flow diagram illustrating the gradient correction computation process. In particular, a gradient-correction gain is determined (box 500). As detailed below, the gain may be determined in a variety of ways. Next, a region of support is defined around a current pixel in a color image (box 510). This region of support is defined as a size of a pixel neighborhood whose color values are considered for computations associated with any given pixel, such as the current pixel. These computations includes computing an interpolation and computing a correction term (such as a gradient).

A gradient correction then is computed (box 520). This gradient is computed using the current pixel (having a current color) and pixels within the region of support also having the current color. The gradient-correction gain then is applied to the gradient correction (box 530). It should be noted that each of the gradient-correction gains is associated with a particular interpolation pattern. Applying the gain to the correction dictates how much of the gradient correction is used to correct the interpolation. Finally, an adjusted gradient correction is output (box 540). This adjusted gradient correction may be linearly combined with the interpolation in order to improve the quality of the interpolation alone.

In order to more fully understand the gradient-corrected linear interpolation method and system disclosed herein, the operational details of an exemplary working example are presented. It should be noted that this working example is only one way in which the gradient-corrected linear interpolation method and system may be implemented.

Gradient Correction

The following formulas are presented to provide a corrected interpolation at a pixel location using a gradient correction. In order to illustrate the details of the gradient-corrected linear interpolation method and system, the interpolation presented in a bilinear interpolation technique. However, it should be noted that any other type of interpolation technique may be used.

Specifically, to interpolate green color values (G) at a red pixel (R) location, the following formula is used:

$$\hat{g}(i,j) = \hat{g}_B(i,j) + \alpha \Delta_R(i,j) \quad (2)$$

where, $\hat{g}(i,j)$ is the gradient-corrected linear interpolation, $\hat{g}_B(i,j)$ is the bilinear interpolation, $\alpha$ is the gradient-correction gain for that particular interpolation pattern, and $\Delta_R(i,j)$ is the gradient of red (R) at that pixel location, computed by $$\Delta_R(i,j) \stackrel{\Delta}{=} r(i,j) - \frac{1}{4} \sum r(i+m, j+n) \quad (3)$$

$$(m,n) = \{(0,-2), (0,2), (-2,0), (2,0)\}$$

Thus, the gradient-corrected linear interpolation method and system corrects the bilinear interpolation estimate by a measure of the gradient $\Delta_R$ for the known color at the pixel location, which is estimated by the simple formula in equation (3). The gradient-correction gain a controls the intensity of such correction. The gradient-corrected linear interpolation method and system is in fact a gradient-corrected bilinear interpolated approach, with a gain parameter to control how much correction is applied.

For interpolating green (G) at blue (B) pixels, the same formula is used, but corrected by $)_B(i,j)$. For interpolating red (R) at green (G) pixels, the following formula is used:

$$\hat{r}(i,j) = \hat{r}_B(i,j) + \beta \Delta_G(i,j) \quad (4)$$

with $\Delta_G(i,j)$ determined by a 9-point region of support, as detailed below.

For interpolating red (R) at blue (B) pixels, the following formula is used:

$$\hat{r}(i,j) = \hat{r}_B(i,j) + \gamma \Delta_B(i,j) \quad (5)$$

with $\gamma_B(i,j)$ computed on a 5-point region of support, as also detailed below.

The formulas for interpolating blue (B) are similar, by symmetry.

Gradient-Correction Gains

In order to determine appropriate values for the gradient-correction gains ($\alpha$, $\beta$, and $\gamma$, one for each of the interpolation patterns, as discussed above), a Wiener approach was used. In other words, the values that led to minimum mean-square error interpolation were computed. This computation was performed using second-order statistics computed from a typical image data set. Next, the optimal Wiener coefficients were approximated by integer multiples of small powers of ½. The final results of the optimal gain values were: $\alpha=\frac{1}{2}$, $\beta=\frac{5}{8}$, and $\gamma=\frac{3}{4}$. From the values of $\{\alpha,\beta,\gamma\}$, the equivalent linear finite impulse response (FIR) filter coefficients for each interpolation case can be computed. The resulting coefficient values make the filters quite close (within 5% in terms of mean-square error) to the optimal Wiener filters for a 5×5 region of support.

Thus, it is believed that the only way to design a practical linear filter with a meaningfully lower mean-square interpolation error would be to use larger regions of support. This would not only increase computational complexity and memory required, but would also lead to ringing artifacts around the edges within the image. One way to evaluate computational complexity is to count the number of nonzero filter coefficients within the 5×5 regions of support. For example, in the paper by S.-C. Pei and I.-K. Tam (cited above), there are 9 nonzero coefficients for the green (G) channel, and an average of 13 each for the red (R) and blue (B) channels. In contrast, the gradient-corrected linear interpolation method and system has a slightly lower complexity, namely, 9 coefficients for the G channel and 11 coefficients each for the R and B channels.

Figures 6A, 6B:
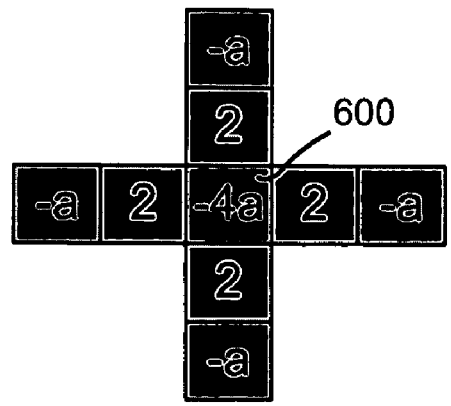
FIG. 6A illustrates the details of the gradient-corrected linear interpolation method for finding a green color value at a red pixel.
FIG. 6B is a detailed diagram illustrating a 5×5 region of support for finding a green color value at a red pixel, as shown in FIG. 6A.

FIGS. 6A-D are detailed diagrams illustrating the gradient-corrected linear interpolation method for finding green color values. In FIG. 6A, a green color value is to be found at a red pixel 600. It should be noted that the parameter "a" is related to the gradient-correction gain $\alpha$ by $a=2\alpha$, as discussed below. As shown in FIG. 6A, an interpolation (such as a bilinear interpolation) is performed using the green pixels surrounding the red pixel 600. In addition, the gradient correction is computed using the red pixels surrounding the red pixel 600 as well as the red pixel 600 itself.

FIG. 6B is a detailed diagram illustrating a 5×5 region of support for finding a green value at a red pixel, as shown in FIG. 6A. In particular, the gradient-corrected linear interpolation method for the 5×5 region of support shown in FIG. 6B includes:

1. Start with bilinearly-interpolated Green:

$$\hat{G}_{33B} = \frac{G_{23} + G_{32} + G_{34} + G_{43}}{4}$$

2. Compute Red gradient:

$$\Delta_{33}^R = R_{33} - \frac{R_{13} + R_{31} + R_{35} + R_{53}}{4}$$

3. Apply correction:

$\hat{G}_{33new} = \hat{G}_{33B} + \alpha\Delta_{33}^R$ where $\alpha$ is a "correction gain", with $0<\alpha<1$. A typical value of $\alpha=\frac{1}{2}$.

Note that the formulas above can be combined in a general FIR-filter-like formula $$\hat{G}_{33new} = \frac{G_{23} + G_{32} + G_{34} + G_{43}}{4} + a\left(R_{33} - \frac{R_{13} + R_{31} + R_{35} + R_{53}}{4}\right)$$

$$= \frac{1}{8}[2(G_{23} + G_{32} + G_{34} + G_{43}) + 4aR_{33} - a(R_{13} + R_{31} + R_{35} + R_{53})]$$

where the parameter a is directly related to the gain $\alpha$ by $a=2\alpha$, so for $\alpha=\frac{1}{2}$ we have $a=1$. In this form, it is clear that the final estimated green (G) value can be computed as a linear combination of the denoted green and red values, using only additions and shifts (since multiplication by 2 and 4 can be performed by one-position and two-position left shifts, respectively, and division by eight can be performed by a three-position right shift).

Figure 6C:
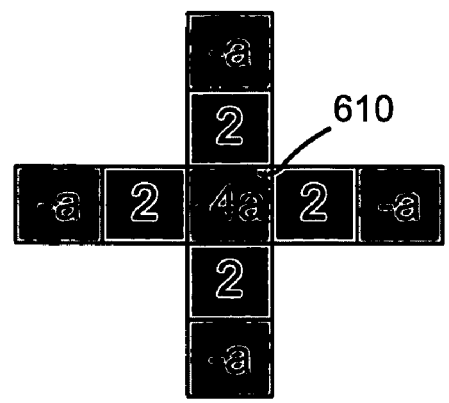
FIG. 6C illustrates the details of the gradient-corrected linear interpolation method for finding a green color value at a blue pixel.

In FIG. 6C, a green color value is to be found at a blue pixel 610. As shown in FIG. 6C, an interpolation (such as a bilinear interpolation) is performed using the green pixels surrounding the blue pixel 610. In addition, the gradient correction is computed using the blue pixels surrounding the blue pixel 610 as well as the blue pixel 610 itself.

Figure 6D:
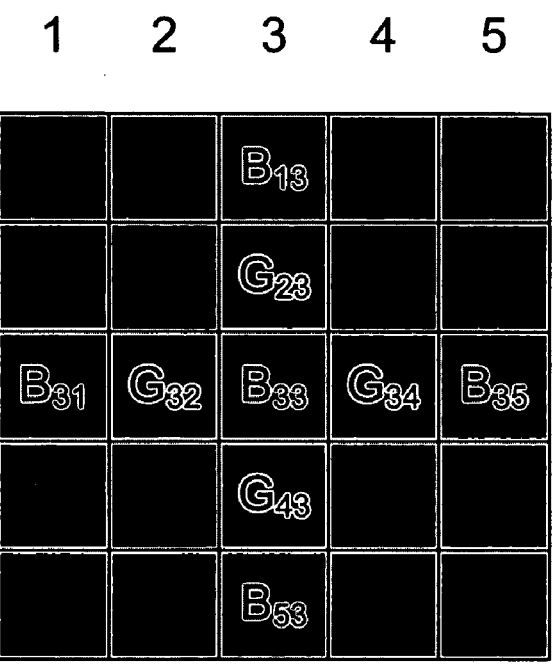
FIG. 6D is a detailed diagram illustrating a 5×5 region of support for finding a green color value at a blue pixel, as shown in FIG. 6C.

FIG. 6D is a detailed diagram illustrating a 5×5 region of support for finding a green value at a blue pixel, as shown in FIG. 6C. In particular, the gradient-corrected linear interpolation method for the 5×5 region of support shown in FIG. 6C includes:

1. Start with bilinearly-interpolated Green:

$$\hat{G}_{33B} = \frac{G_{23} + G_{32} + G_{34} + G_{43}}{4}$$

2. Compute Blue gradient:

$$\Delta_{33}^B = B_{33} - \frac{B_{13} + B_{31} + B_{35} + B_{53}}{4}$$

3. Apply correction:

$\hat{G}_{33new} = \hat{G}_{33B} + \alpha\Delta_{33}^B$ where $\alpha$ is a "correction gain", with $0<\alpha<1$. A typical value of $\alpha=\frac{1}{2}$.

As before, the formulas above can be combined in a general FIR-filter-like formula $$\hat{G}_{33new} = \frac{G_{23} + G_{32} + G_{34} + G_{43}}{4} + a\left(B_{33} - \frac{B_{13} + B_{31} + B_{35} + B_{53}}{4}\right)$$

$$= \frac{1}{8}[2(G_{23} + G_{32} + G_{34} + G_{43}) + 4aB_{33} - a(B_{13} + B_{31} + B_{35} + B_{53})]$$

where again the parameter a is directly related to the gain $\alpha$ by $a=2\alpha$, so for $\alpha=\frac{1}{2}$ we have $a=1$. Again, it is clear that the above filtering operation can be efficiently computed using only additions and shifts.

Figures 7A, 7B:
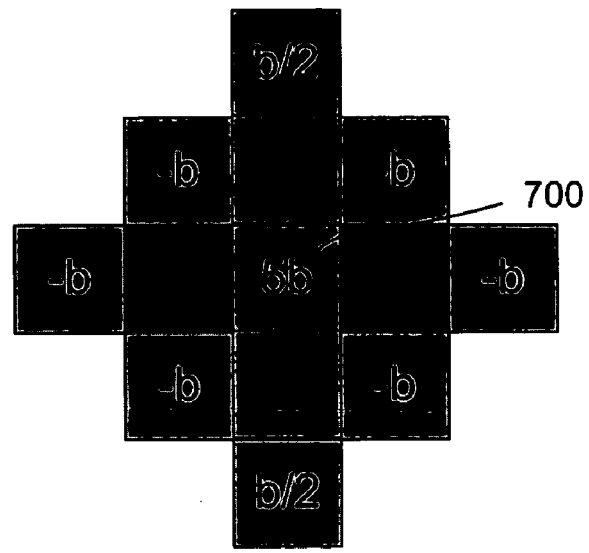
FIG. 7A illustrates the details of the gradient-corrected linear interpolation method for finding a red color value at a green pixel located in a red row and a blue column.
FIG. 7B is a detailed diagram illustrating a 5×5 region of support for finding a red color value at a green pixel, as shown in FIG. 7A.

FIGS. 7A-E are detailed diagrams illustrating the gradient-corrected linear interpolation method for finding red color values. In FIG. 7A, a red color value is found at a green pixel 700. The green pixel 700 is located in a red row and a blue column. It should be noted that the parameter "b" is related to the gradient-correction gain β by b =(8/5)β, as discussed below. As shown in FIG. 7A, an interpolation (such as a bilinear interpolation) is performed using the two red pixels horizontally neighboring the green pixel 700. Moreover, the gradient correction is computed using the green pixels surrounding the green pixel 700 as well as the green pixel 700 itself.

FIG. 7B is a detailed diagram illustrating a 5×5 region of support for finding a red value at a green pixel, as shown in FIG. 7A. In particular, the gradient-corrected linear interpolation method for the 5×5 region of support shown in FIG. 7A includes:

1. Start with bilinearly-interpolated Red:

$$\hat{R}_{33B} = \frac{R_{32} + R_{34}}{2}$$

2. Compute Green gradient:

$$\Delta_{33}^G = G_{33} - \frac{G_{22} + G_{24} + G_{31} + G_{35} + G_{42} + G_{44} - (G_{13} + G_{53})/2}{5}$$

3. Apply correction:

$$\hat{R}_{33new} = \hat{R}_{33B} + \beta \Delta_{33}^G$$

where β is a "correction gain", with 0<β<1. A typical value is β=5/8.

Note that the formulas above can be combined in a general FIR-filter-like formula $$\hat{R}_{33new} = \frac{R_{32} + R_{34}}{2} + \beta\left(G_{33} - \frac{G_{22} + G_{24} + G_{31} + G_{35} + G_{42} + G_{44} - (G_{13} + G_{53})/2}{5}\right)$$
$$= \frac{1}{8}[4(R_{32} + R_{34}) + 5bG_{33} - b(G_{22} + G_{24} + G_{31} + G_{35} + G_{42} + G_{44}) - (b/2)(G_{13} + G_{53})]$$

where the parameter b is directly related to the gain β by b=(8/5)β, so for β=5/8 we have b=1. In this form, it is clear that the final estimated red (R) value can be computed as a linear combination of the denoted red and green values, using only additions and shifts (e.g. multiplication by 5 can be performed by a two-position left shift and an addition).

Figure 7C:
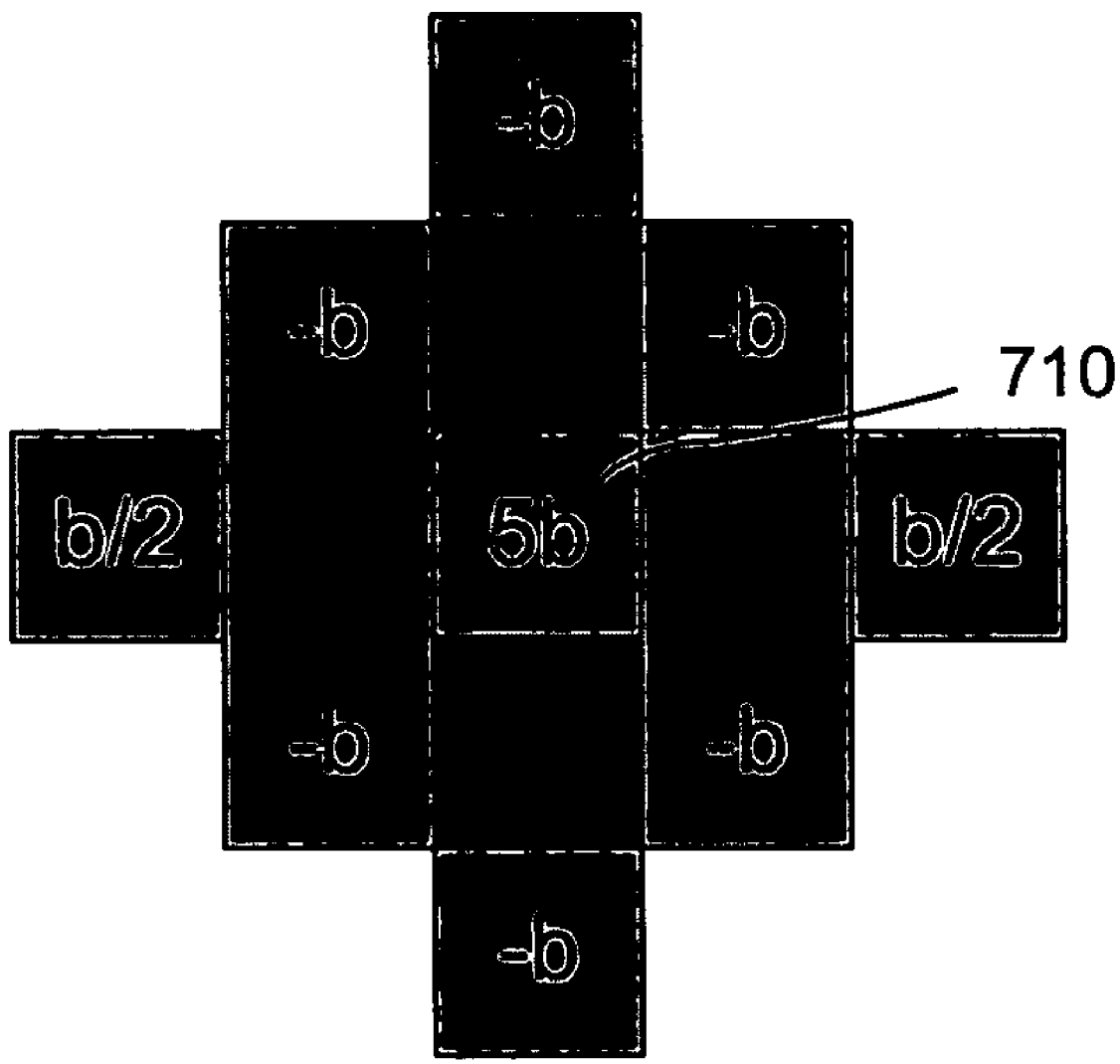
FIG. 7C illustrates the details of the gradient-corrected linear interpolation method for finding a red color value at a green pixel located in a blue row and a red column.

In FIG. 7C, a red color value is to be found at a green pixel 710. In this case, however, the green pixel 710 is located in a blue row and a red column. As shown in FIG. 7C, an interpolation (such as a bilinear interpolation) is performed using the two red pixels vertically neighboring the green pixel 710. Similar to the situation shown in FIGS. 7A and 7B, the gradient correction is computed using the green pixels surrounding the green pixel 710 as well as the green pixel 710 itself.

Figures 7D, 7E:
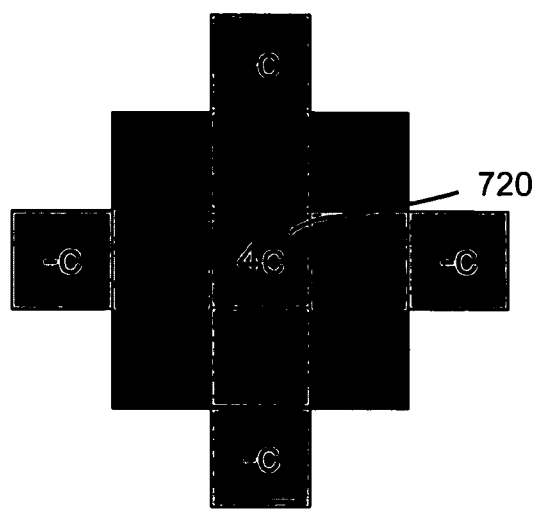
FIG. 7D illustrates the details of the gradient-corrected linear interpolation method for finding a red color value at a blue pixel.
FIG. 7E is a detailed diagram illustrating a 5×5 region of support for finding a red color value at a blue pixel, as shown in FIG. 7D.

In FIG. 7D, a red color value is to be found at a blue pixel 720. It should be noted that the parameter "c" is related to the gradient-correction gain γ by c=2γ, as discussed below. As shown in FIG. 7D, an interpolation (such as a bilinear interpolation) is performed using the four red pixels neighboring the blue pixel 720. Moreover, the gradient correction is computed using the blue pixels surrounding the blue pixel 720 as well as the blue pixel 720 itself.

FIG. 7E is a detailed diagram illustrating a 5×5 region of support for finding a red value at a blue pixel, as shown in FIG. 7D. In particular, the gradient-corrected linear interpolation method for the 5×5 region of support shown in FIG. 7D includes:

1. Start with bilinearly-interpolated Red:

$$\hat{R}_{33B} = \frac{R_{22} + R_{24} + R_{42} + R_{44}}{4}$$

2. Compute Blue gradient:

$$\Delta_{33}^B = B_{33} - \frac{B_{13} + B_{31} + B_{35} + B_{53}}{4}$$

3. Apply correction:

$$\hat{R}_{33new} = \hat{R}_{33B} + \gamma \Delta_{33}^B$$

where γ is a "correction gain", with 0<γ<1. A typical value is γ=3/4.

Note that the formulas above can be combined in a general FIR-filter-like formula $$\hat{R}_{33new} = \frac{R_{22} + R_{24} + R_{42} + R_{44}}{4} + \gamma\left(B_{33} - \frac{B_{13} + B_{31} + B_{35} + B_{53}}{4}\right)$$
$$= \frac{1}{8}[2(R_{22} + R_{24} + R_{42} + R_{44}) + 4cB_{33} - c(B_{13} + B_{31} + B_{35} + B_{53})]$$

where the parameter c is directly related to the gain γ by c=2γ, so for γ=3/4 we have c=3/2. In this form, it is clear that the final estimated red (R) value can be computed as a linear combination of the denoted red and blue values, using only additions and shifts (e.g. multiplication by 3/2 can be performed by a one-position right shift and an addition).

Figures 8A, 8B:
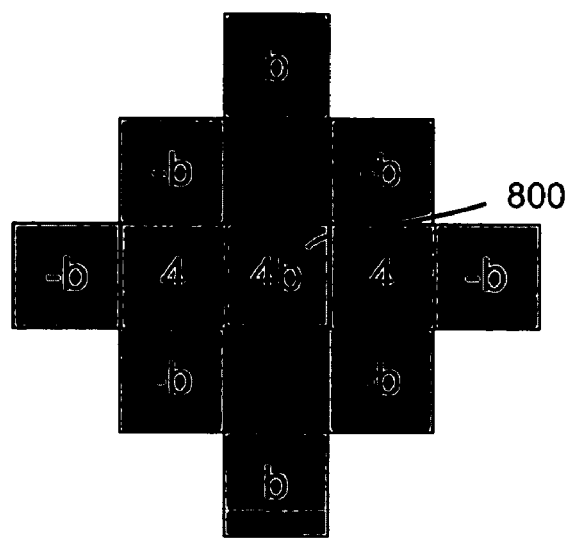
FIG. 8A illustrates the details of the gradient-corrected linear interpolation method for finding a blue color value at a green pixel located in a blue row and a red column.
FIG. 8B is a detailed diagram illustrating a 5×5 region of support for finding a blue color value at a green pixel, as shown in FIG. 8A.

FIGS. 8A-E are detailed diagrams illustrating the gradient-corrected linear interpolation method for finding blue color values. In FIG. 8A, a blue color value is found at a green pixel 800. The green pixel 800 is located in a blue row and a red column. It should be noted that the parameter "b" is related to the gradient-correction gain β by b=(8/5)β, as discussed above. As shown in FIG. 8A, an interpolation (such as a bilinear interpolation) is performed using the two blue pixels horizontally neighboring the green pixel 800. In addition, the gradient correction is computed using the eight green pixels surrounding the green pixel 800 as well as the green pixel 800 itself.

FIG. 8B is a detailed diagram illustrating a 5×5 region of support for finding a blue value at a green pixel, as shown in FIG. 8A. In particular, the gradient-corrected linear interpolation method for the 5×5 region of support shown in FIG. 8A includes:

1. Start with bilinearly-interpolated Blue:

$$\hat{B}_{33B} = \frac{B_{32} + B_{34}}{2}$$

2. Compute Green gradient:

$$\Delta_{33}^G = G_{33} - \frac{G_{22} + G_{24} + G_{31} + G_{35} + G_{42} + G_{44} - (G_{13} + G_{53})/2}{5}$$

3. Apply correction:

$$\hat{B}_{33new} = \hat{B}_{33B} + \beta\Delta_{33}^G$$

where $\beta$ is a "correction gain", with $0<\beta<1$. A typical value is $\beta=5/8$.

Note that the formulas above can be combined in a general FIR-filter-like formula $$\hat{B}_{33new} = \frac{B_{32} + B_{34}}{2} +$$
$$\beta\left(G_{33} - \frac{G_{22} + G_{24} + G_{31} + G_{35} + G_{42} + G_{44} - (G_{13} + G_{53})/2}{5}\right)$$
$$= \frac{1}{8}[4(B_{32} + B_{34}) + 5bG_{33} -$$
$$b(G_{22} + G_{24} + G_{31} + G_{35} + G_{42} + G_{44}) - (b/2)(G_{13} + G_{53})]$$

where the parameter b is directly related to the gain $\beta$ by $b=(8/5)\beta$, so for $\beta=5/8$ we have $b=1$, as discussed above.

Figure 8C:
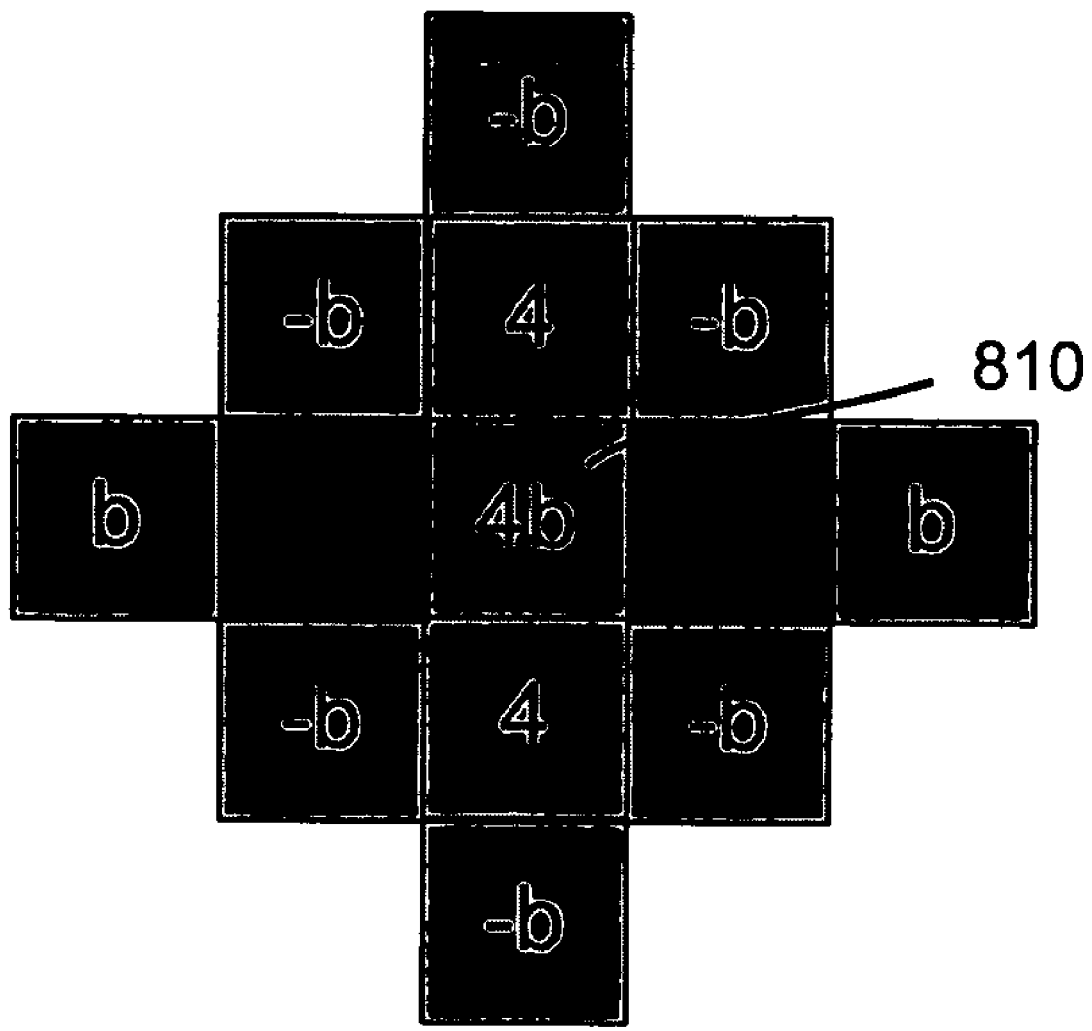
FIG. 8C illustrates the details of the gradient-corrected linear interpolation method for finding a blue color value at a green pixel located in a red row and a blue column.

In FIG. 8C, a blue color value is to be found at a green pixel 810. In this case, however, the green pixel 810 is located in a red row and a blue column. As shown in FIG. 8C, an interpolation (such as a bilinear interpolation) is performed using the two blue pixels vertically neighboring the green pixel 810. Similar to the situation shown in FIGS. 8A and 8B, the gradient correction is computed using the eight green pixels surrounding the green pixel 810 as well as the green pixel 810 itself.

Figures 8D, 8E:
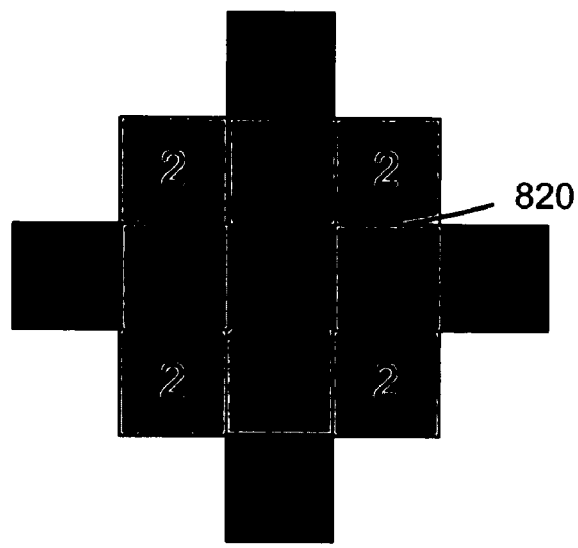
FIG. 8D illustrates the details of the gradient-corrected linear interpolation method for finding a blue color value at a red pixel.
FIG. 8E is a detailed diagram illustrating a 5×5 region of support for finding a blue color value at a red pixel, as shown in FIG. 8D.

In FIG. 8D, a blue color value is to be found at a red pixel 820. It should be noted that the parameter "c" is related to the gradient-correction gain $\gamma$ by $c=2\gamma$, as discussed above. As shown in FIG. 8D, an interpolation (such as a bilinear interpolation) is performed using the four blue pixels neighboring the red pixel 820. In addition, the gradient correction is computed using the four red pixels surrounding the red pixel 820 as well as the red pixel 820 itself.

FIG. 8E is a detailed diagram illustrating a 5×5 region of support for finding a blue value at a red pixel, as shown in FIG. 8D. In particular, the gradient-corrected linear interpolation method for the 5×5 region of support shown in FIG. 8D includes:

1. Start with bilinearly-interpolated Red:

$$\hat{B}_{33B} = \frac{B_{22} + B_{24} + B_{42} + B_{44}}{2}$$

2. Compute Red gradient:

$$\Delta_{33}^R = R_{33} - \frac{R_{13} + R_{31} + R_{35} + R_{53}}{4}$$

3. Apply correction:

$$\hat{B}_{33new} = \hat{B}_{33B} + \gamma\Delta_{33}^R$$

where $\gamma$ is a "correction gain", with $0<\gamma<1$. A typical value is $\gamma=3/4$.

Note that the formulas above can be combined in a general FIR-filter-like formula $$\hat{B}_{33new} = \frac{B_{22} + B_{24} + B_{42} + B_{44}}{2} + \gamma\left(R_{33} - \frac{R_{13} + R_{31} + R_{35} + R_{53}}{4}\right)$$
$$= \frac{1}{8}[2(B_{22} + B_{24} + B_{42} + B_{44}) + 4R_{33} -$$
$$c(R_{13} + R_{31} + R_{35} + R_{53})]$$

where the parameter c is directly related to the gain $\gamma$ by $c=2\gamma$, so for $\gamma=3/4$ we have $c=3/2$. In this form, it is clear that the final estimated red (R) value can be computed as a linear combination of the denoted blue and red values, using only additions and shifts, as discussed above.

It should be noted that there are three types of interpolation patterns, so there are three types of gradient-correction gains ($\alpha,\beta,\gamma$). These gains may be selected in a variety of ways. One way is to use the optimal gain values. In general, these optimal values are $\alpha=1/2$, $\beta=5/8$, and $\gamma=3/4$. The differences between the optimal gain values are due to the differences in correlation when looking at the different patterns.

In actuality, the optimal gain values are not exactly $1/2$, $5/8$, and $3/4$, respectively. They are close, but for implementation purposes they are approximated by the nearest number that can be a rational number where the denominator is a power of 2. This simplifies operations and eliminates the need for floating point arithmetic, thus greatly simplifying computational complexity. Division by 8 is merely a shift of 3 bits to the right, so that computations can be done in integer arithmetic. Thus, this particular selection of gains has to do with ensuring that computations are performed in integer arithmetic with no division.

Another way to pick the gains is based dependent on the digital camera manufacturer. The lens of most digital cameras usually performs some optical low-pass filtering (or blurring). This is because manufacturers know that demosaicing will produce some color fringes, and if they blur the image slightly before it hits the sensor the fringes caused by the demosaicing will be attenuated.

Each manufacturer uses its own color matrix (even though it is a Bayer matrix, they often use different types of color filtering). This means that the frequency response will look slightly different between the manufacturers. For example, with a first manufacturer's filter, there may be less correlation between the blue and the red than a filter from another manufacturer. Given the frequency response and correlation statistics for each different manufacturer's cameras, the gains can be fine-tuned based on these statistics. Moreover, these gains could be reapproximated to simpler values, such as values that allow integer arithmetic and no division.

The gains can also be selected in an adaptive manner. In adaptive gain selection, the gains vary based on statistics of the image. The statistics may be global or local. Global image statistics are based on the image as a whole. Local image statistics are based not only on the entire image, but also on specific regions within the image. From such statistics better inter-channel correlation values can be computed, so the corresponding new optimal Wiener filter gains could be determined. Computation of global and local image statistics, as well as Wiener filtering, is well known in the art and will not be discussed further.

Performance

The gradient-corrected linear interpolation method and system were compared to several others types of interpolation techniques. This comparison was performed using a well-known public-domain Kodak image set, simulating a Bayer sampling array (simply by keeping only one of each of the RGB values for each pixel), and then applying the various interpolation algorithms. This subsampling approach is not really representative of digital cameras, which usually employ careful lens design to effectively perform a small amount of low-pass filtering to reduce the aliasing due to the Bayer pattern subsampling. However, since all papers cited above perform just subsampling, with no low-pass filtering, the same was done so that results could be compared. In addition, all interpolation methods were tested with small amounts of Gaussian low-pass filtering before Bayer subsampling, and it was found that the relative performances of the methods are roughly the same, with or without filtering. The gradient-corrected linear interpolation method and system showed an improvement in peak-signal-to-noise ratio (PSNR) over bilinear interpolation techniques. Moreover, except for Freeman's interpolation technique, most approaches lead to more than a 5 dB improvement. On average, the gradient-corrected linear interpolation method and system outperforms most other interpolation techniques.

Besides PSNR measurements, visual quality was verified using one of the images in the Kodak set. The gradient-corrected linear interpolation method and system yielded a visual quality similar to a good nonlinear method (such as discussed in the Kimmel paper (cited above)), but with a much lower complexity. Compared to the interpolation technique discussed in the Pei-Tam paper, the gradient-corrected linear interpolation method and system produced slightly less visible color fringing distortion, as well as a lower PSNR, at a slightly reduced computational complexity.

The gradient-corrected linear interpolation method and system is nearly optimal in a Wiener sense, and in fact outperforms many more complex nonlinear interpolation techniques. Compared to a recently introduced linear demosaicing technique, the gradient-corrected linear interpolation method and system produce a 0.5 dB improvement in interpolated image quality and a 12% reduction in mean-square error. This comes from the same quality for the green channel and about 0.7 dB improvement for the red and blue channels. In addition, compared to the technique discussed in the Pei-Tam paper, the gradient-corrected linear interpolation method and system also leads to a small reduction (roughly 12%) in computational complexity.

V. Exemplary Operating Environment

The gradient-corrected linear interpolation method and system are designed to operate in a computing environment and on a computing device, such as the processing device 370 contained in the digital camera system 310 or in the computing device 380. The computing environment in which the gradient-corrected linear interpolation method and system operates will now be discussed. The following discussion is intended to provide a brief, general description of a suitable computing environment in which the gradient-corrected linear interpolation method and system may be implemented.

Figure 9:
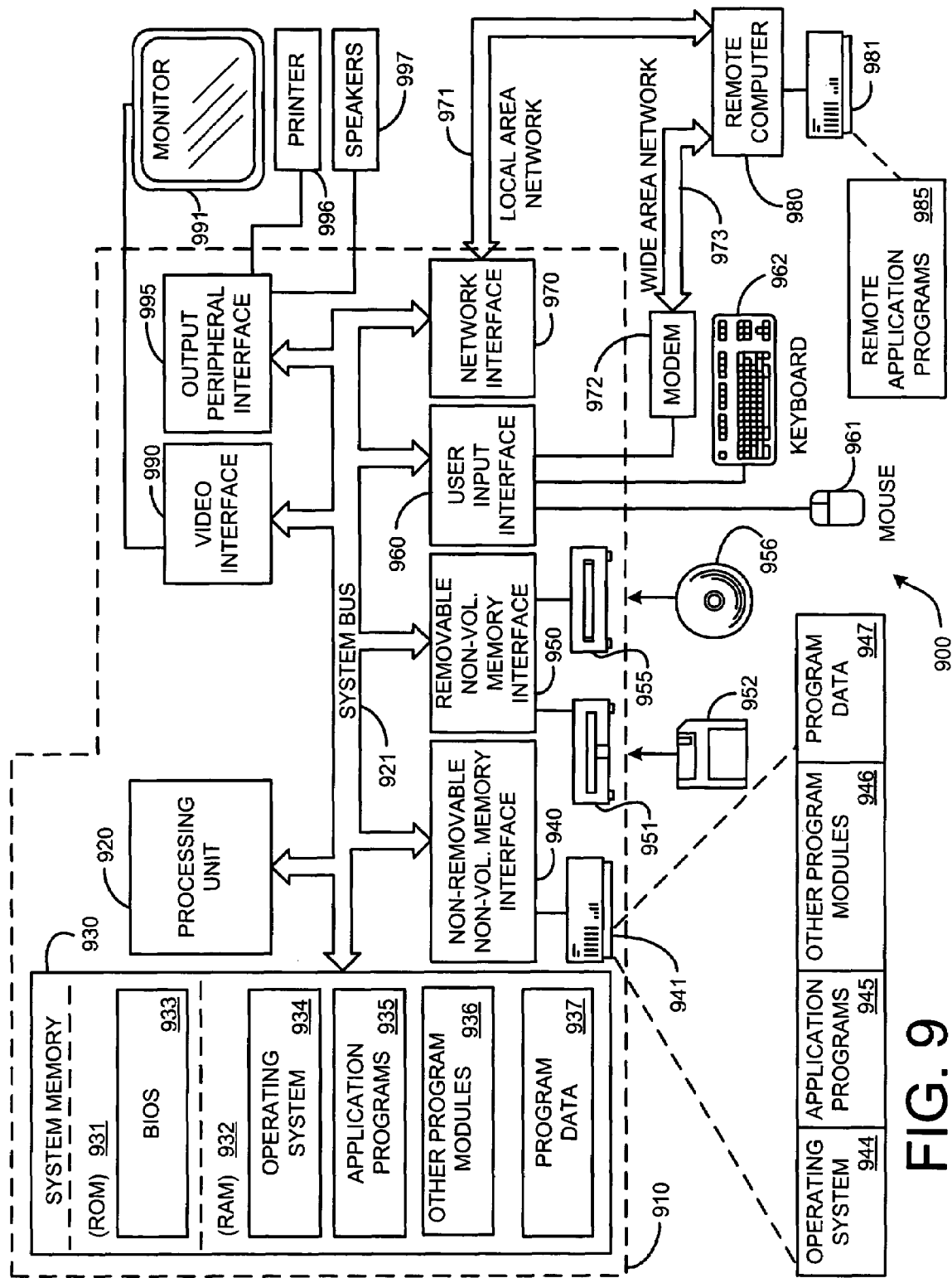
FIG. 9 illustrates an example of a suitable computing system environment in which the gradient-corrected linear interpolation method and system shown in FIG. 3 may be implemented.

FIG. 9 illustrates an example of a suitable computing system environment in which the gradient-corrected linear interpolation method and system shown in FIG. 3 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The gradient-corrected linear interpolation method and system is operational with numerous other general purpose or special purpose computing system environments or configurations. Examples of well known computing systems, environments, and/or configurations that may be suitable for use with the gradient-corrected linear interpolation method and system include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The gradient-corrected linear interpolation method and system may be described in the general context of computer-executable instructions, such as program modules, being executed by a computer. Generally, program modules include routines, programs, objects, components, data structures, etc., that perform particular tasks or implement particular abstract data types. The gradient-corrected linear interpolation method and system may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for implementing the gradient-corrected linear interpolation method and system includes a general-purpose computing device in the form of a computer 910.

Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB).

A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

VI. System Components

Figure 10:
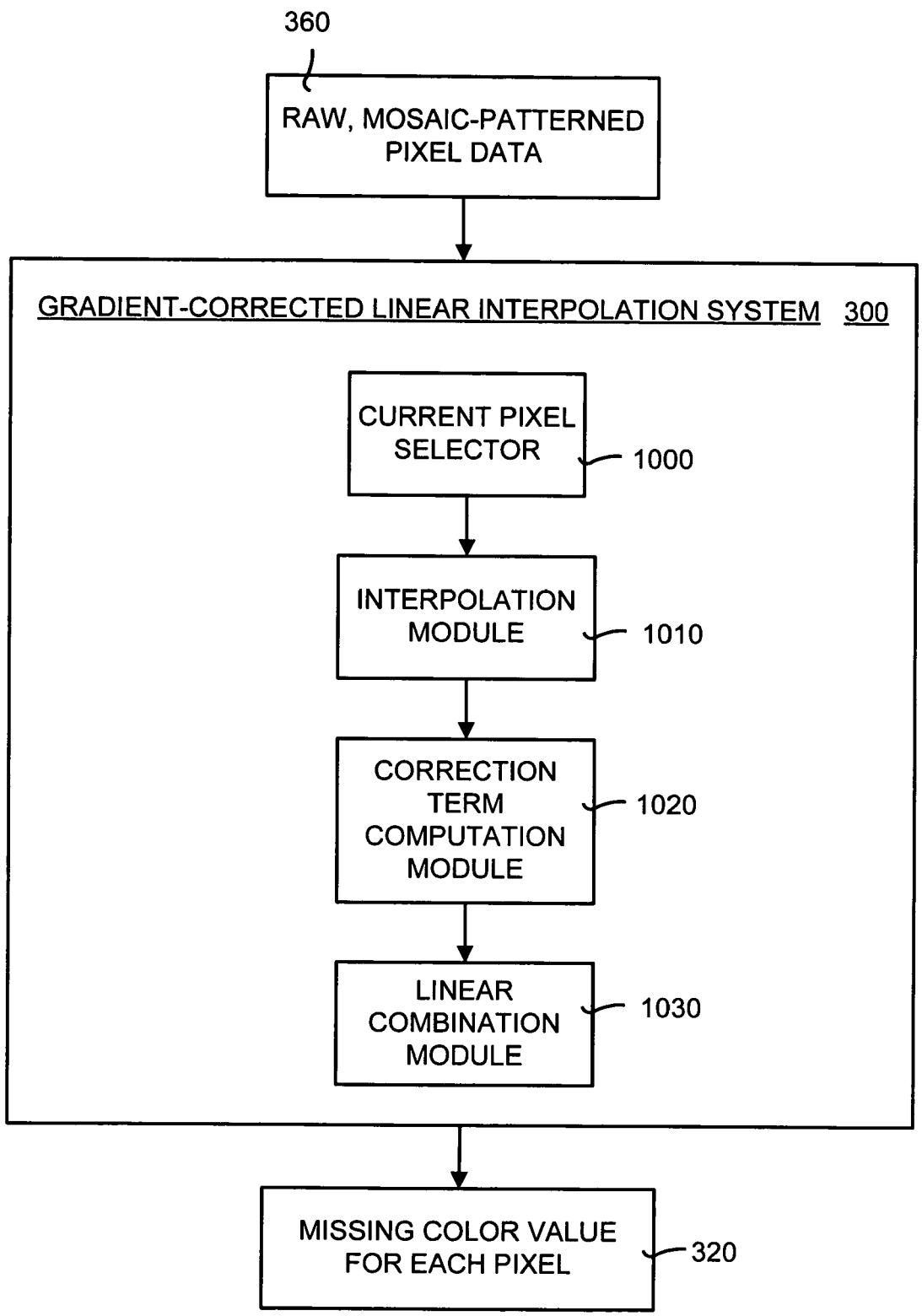
FIG. 10 is a block diagram illustrating the details of the gradient-corrected linear interpolation system shown in FIG. 3.

The gradient-corrected linear interpolation system 300 shown in FIGS. 3A and 3B includes a number of program modules that allow the system 300 to produce a high-quality interpolation of missing color at a pixel in a quick, simple and efficient manner. FIG. 10 is a block diagram illustrating the details of the gradient-corrected linear interpolation system 300 shown in FIG. 3. The program modules contained in the system 300 now will be discussed.

In general, referring to FIG. 10, the gradient-corrected linear interpolation system 300 inputs color information including the raw, mosaic-patterned pixel data 360 produced by the image sensor array 315, processes the information, and outputs one or more missing color values for each pixel 320. More specifically, the gradient-corrected linear interpolation system 300 includes a current pixel selector 1000 that selects a current pixel having a current color from the image sensor array that represents a color image. An interpolation module 1010 computes a first interpolation of color value that is missing and desired at the current pixel. The interpolation uses pixels having the desired color with a region of support.

The gradient-corrected linear interpolation system 300 also includes a correction term module 1020 that computes a correction term for the interpolation. Preferably, the correction term is computed from a gradient of pixels within a region of support having the color of the current pixel. Once the interpolation and correction term are computed, a linear combination module 1030 linearly combines the interpolation and correction term to obtain the desired (or missing) color value at the current pixel 320. Preferably, the interpolation and correction term are added together to obtain a correct interpolation that estimates the desired (or missing) color value at the current pixel 320.

Figure 11:
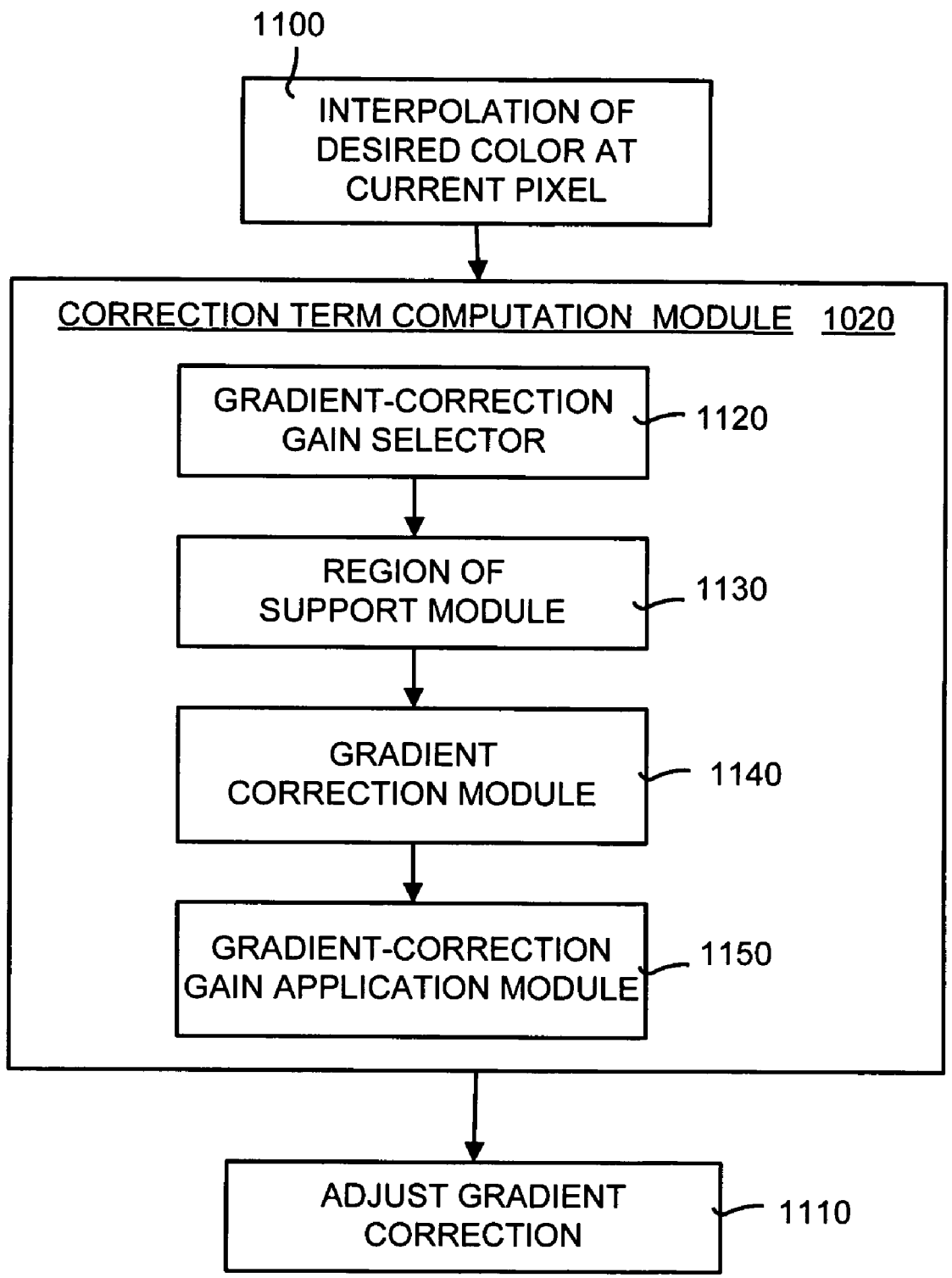
FIG. 11 is a block diagram illustrating the details of the correction term computation module shown in FIG. 10.

FIG. 11 is a block diagram illustrating the details of the correction term computation module 1020 shown in FIG. 10. Generally, an interpolation of the desired color at the current pixel 1100 is input into the correction term computation module 1020, a correction term is computed, and an adjust gradient correction is output 1110.

In particular, the correction term computation module 1020 includes a gradient-correction selector 1120 that selects the amount of correction that will be applied. A region of support module 1130 defines a region of support around the current pixel. Preferably, the region of support is a 5×5 pixel array centered at the current pixel.

The correction term computation module 1020 also includes a gradient correction module 1140 that computes a gradient correction using the current pixel. In addition, the module 1140 uses pixels within the region of support that are of the current color, in other words, the same color as the current pixel. A gradient-correction gain application module 1150 applies the gain to the computed gradient correction such that an adjusted gradient correction is output 1110.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for interpolating a desired color at a current pixel in a color image, the current pixel having a current color, comprising:
using a computer to perform the following process actions:
computing an interpolation of the desired color at the current pixel using the desired color;
computing a gradient correction term using the current color;
determining a gradient-correction gain such that a mean-square error is minimized to produce an optimal gradient-correction gain;
applying the optimal gradient-correction gain to the gradient correction term to determine an amount of the gradient correction linearly combined with the interpolation; and
linearly combining the interpolation and the gradient correction term to obtain a corrected interpolation of the desired color at the current pixel.

2. The method as set forth in claim 1, further comprising using neighboring pixels of the desired color in computing the interpolation.

3. The method as set forth in claim 1, further comprising using the current pixel in computing the correction term.

4. The method as set forth in claim 3, further comprising using neighboring pixels of the current color in computing the correction term.

5. The method as set forth in claim 1, wherein the interpolation is a bilinear interpolation technique.

6. The method as set forth in claim 1, further comprising adding the interpolation and the correction term to obtain a corrected interpolation.

7. A computer-implemented method for interpolating a desired color at a current pixel in an image sensor, the current pixel having a first color, comprising:
using a computer to perform the following process actions:
computing a first interpolation of the desired color at the current pixel using pixels having the desired color;
computing a gradient correction using pixels having the first color;
linearly combining the first interpolation and the gradient correction to obtain a gradient-corrected interpolation of the desired color at the current pixel;
applying a gradient-correction gain to the gradient correction to affect the amount of the gradient correction that is linearly combined with the first interpolation; and
selecting the gradient-correction gain such that a mean-square error is minimized to produce an optimal gradient-correction gain.

8. The computer-implemented method of claim 7, further comprising adjusting the optimal gradient-correction gain to produce a simplified gradient-correction gain that allows computations using at least one of: (a) integer arithmetic; (b) no division operations.

9. The computer-implemented method of claim 7, wherein the first interpolation is a linear interpolation.

10. The computer-implemented method of claim 9, wherein the linear interpolation is a bilinear interpolation.

11. The computer-implemented method of claim 7, wherein the first interpolation is at least one of: (a) a bilinear interpolation; (b) a bi-cubic interpolation; (c) a Lanczos interpolation.

12. The computer-implemented method of claim 7, further comprising:
defining a region of support as a size of a pixel neighborhood whose values are considered for computation associated with any given pixel;
selecting the region of support to include pixels nearest the current pixel having the first color; and
using the region of support to compute the first interpolation and the gradient correction.

13. The computer-implemented method of claim 12, wherein the region of support is a 5×5 pixel region centered at the current pixel.

14. The computer-implemented method of claim 12, wherein the region of support is greater than a 5×5 pixel region centered at the current pixel.

15. The computer-implemented method of claim 14, wherein the first interpolation is a nonlinear interpolation.

16. The computer-implemented method of claim 12, further comprising:
using a first region of support to compute the first interpolation; and
using a second region of support to compute the gradient correction.

17. The computer-implemented method of claim 16, wherein the first region of support is different from the second region of support.

18. A computer-readable medium having stored and encoded thereon computer-executable instructions for performing on the computer the computer-implemented method recited in claim 7.

19. A method for interpolating missing red-blue-green (RGB) data at a current pixel having a current color in a color image sensor, comprising:
using a computer to perform the following process actions:
using a first interpolation technique based on a missing color at the current pixel to determine a missing color estimate;
calculating a gradient correction based on the current color;
adjusting a gradient-correction gain based on characteristics of the color image sensor;

multiplying the gradient correction by the gradient-correction gain to obtain an adjusted gradient correction; and combining in a linear manner the missing color estimate and the adjusted gradient correction to obtain a linearly corrected missing color estimate corresponding to at least some of the missing RGB data.

20. The method of claim 19, wherein the first interpolation technique is a bilinear interpolation.

21. The method of claim 19, wherein the gradient correction is a linear operator.

22. The method of claim 19, wherein the color image sensor is integrated into a digital camera system, and further comprising adjusting the gradient-correction gain based on characteristics of the digital camera system.

23. A process for linearly interpolating a missing color of a present pixel within a color image produced by a digital camera system having an image sensor, the present pixel having a first color, the process comprising:

using a computer to perform the following process actions:
defining a first region of support centered at the present pixel;
interpolating the missing color using an interpolation technique to obtain a first missing color estimation, the interpolation technique using pixels within the first region of support having the missing color;
defining a second region of support centered at the present pixel;
calculating a gradient correction using the present pixel and pixels within the second region of support having the first color;
applying a gradient-correction gain to the gradient correction that represents a percentage of the gradient correction to be used;
measuring global statistics of the color image;
varying the gradient-correction gain based on the global statistics; and
linearly combining the first missing color estimation and the gradient correction to obtain a gradient-corrected estimation of the missing color.

24. The process as set forth in claim 23, further comprising:
measuring local statistics for each region in the color image; and
varying the gradient-correction gain based on the local statistics.

25. The process as set forth in claim 23, further comprising computing the gradient-correction gain based on the missing color.

26. The process as set forth in claim 25, wherein the missing color is green, and further comprising setting the gradient-correction gain to a value of ½.

27. The process as set forth in claim 25, wherein the missing color is red, and further comprising setting the gradient-correction gain to a value of ⅝.

28. The process as set forth in claim 25, wherein the missing color is blue, and further comprising setting the gradient-correction gain to a value of ¾.

29. The process as set forth in claim 23, wherein the first and second regions of support are a 5×5 matrix of pixels.

30. A gradient-corrected linear interpolation system for interpolating a missing color value at a given pixel in a color image, the given pixel having a current color, comprising:
a general-purpose computer;
a computer-readable storage medium having stored and encoded thereon a computer program having program modules containing computer-executable instructions that are executable by the general-purpose computer, the computer program further comprising:
an interpolation module that computes an interpolation of the missing color value;
a correction term computation module that computes a gradient correction term for the interpolation, the correction term computation module further comprising:
a gradient-correction selector that determines a gradient-correction gain such that a mean-square error is minimized to produce an optimal gradient-correction gain and applies the optimal gradient-correction gain to the gradient correction term to determine an amount of gradient correction linearly combined with the interpolation; and
a linear combination module that linearly combines the interpolation and correction term to produce a corrected interpolation for the missing color value at the given pixel.

31. The gradient-corrected linear interpolation system as set forth in claim 30, wherein the correction term computation module further comprises a region of support module that selects a size of a region of support around the given pixel centered at the given pixel.

32. The gradient-corrected linear interpolation system as set forth in claim 30, wherein the correction term computation module further comprises a gradient correction module that computes a gradient correction using the given pixel and pixels in a region of support having the current color.

* * * * *